(12) United States Patent
Katagiri et al.

(10) Patent No.: US 10,796,057 B2
(45) Date of Patent: Oct. 6, 2020

(54) SUPPORT APPARATUS AND DESIGN SUPPORT METHOD

(71) Applicant: FUJITSU LIMITED, Kawasaki-shi, Kanagawa (JP)

(72) Inventors: Hideaki Katagiri, Fujisawa (JP); Yasuo Amano, Nukata (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/116,987

(22) Filed: Aug. 30, 2018

(65) Prior Publication Data

US 2019/0073441 A1 Mar. 7, 2019

(30) Foreign Application Priority Data

Sep. 4, 2017 (JP) ................................ 2017-169612

(51) Int. Cl.
*G06F 30/00* (2020.01)
*G06F 30/392* (2020.01)
*G06F 111/04* (2020.01)

(52) U.S. Cl.
CPC ........ *G06F 30/392* (2020.01); *G06F 2111/04* (2020.01)

(58) Field of Classification Search
CPC ........................... G06F 17/5072; G06F 30/392
USPC ....................................................... 716/122
See application file for complete search history.

(56) References Cited

U.S. PATENT DOCUMENTS

| | | | | |
|---|---|---|---|---|
| 5,901,065 A * | 5/1999 | Guruswamy | ....... | G06F 17/5068 257/E27.063 |
| 5,984,510 A * | 11/1999 | Guruswamy | ....... | G06F 17/5068 716/104 |
| 5,987,086 A * | 11/1999 | Raman | ................ | G06F 17/5077 716/120 |
| 5,995,734 A * | 11/1999 | Saika | .................. | G06F 17/5068 716/52 |
| 6,209,123 B1 * | 3/2001 | Maziasz | ................. | G06F 30/39 716/123 |
| 10,503,858 B1 * | 12/2019 | Yu | .......................... | G06F 30/392 |
| 2008/0074929 A1 * | 3/2008 | Shiga | .................. | G06F 17/5077 365/185.17 |
| 2008/0270957 A1 | 10/2008 | Orita | | |
| 2016/0085897 A1 * | 3/2016 | Jeong | .................... | G06F 30/392 716/122 |

FOREIGN PATENT DOCUMENTS

| JP | 2-165654 | 6/1990 |
|---|---|---|
| JP | 11-274311 | 10/1999 |
| JP | 2008-277497 | 11/2008 |

* cited by examiner

*Primary Examiner* — Suchin Parihar
(74) *Attorney, Agent, or Firm* — Fujitsu Patent Center

(57) ABSTRACT

There is provided a design support apparatus including a memory, and a processor coupled to the memory and the processor configured to obtain an arrangement target cell, and arrange the arrangement target cell at a position satisfying a condition of an arrangement position recommended for each cell when the arrangement target cell is arranged, based on definition information for defining the condition.

14 Claims, 19 Drawing Sheets

FIG. 6

42a
```
CELL_START=AAA;
PLACE_GUIDE_ROT=0;
PLACE_GUIDE_KIND=WIRE;
PLACE_GUIDE_POWER=VSS;
PLACE_GUIDE_LAYER=METAL3;
PLACE_GUIDE_DIR=X;
PLACE_GUIDE_MASKCOLOR=2;
PLACE_GUIDE_WIDTH=0.1;
PLACE_GUIDE_DISTANCE=0.05;
PLACE_GUIDE_XXXXX=YYYY;
PLACE_GUIDE_ZZZZ=BBBBB;
CELL_END=AAA;
```

42b
```
CELL_START=AAA;
PLACE_GUIDE_ROT=0;
PLACE_GUIDE_KIND=VIA;
PLACE_GUIDE_POWER=VSS;
PLACE_GUIDE_LAYER=METAL2;
PLACE_GUIDE_DIR=Y;
PLACE_GUIDE_MASKCOLOR=2;
PLACE_GUIDE_DISTANCE=0.05;
PLACE_GUIDE_XXXXX=YYYY;
PLACE_GUIDE_ZZZZ=BBBBB;
CELL_END=AAA;
```

42c
```
CELL AAA;
DEFINE_START=1;
  PLACE_GUIDE_ROT=0;
  PLACE_GUIDE_KIND=WIRE;
  PLACE_GUIDE_POWER=VSS;
  PLACE_GUIDE_LAYER=METAL3;
  PLACE_GUIDE_DIR=X;
  PLACE_GUIDE_WIDTH=0.1;
  PLACE_GUIDE_DISTANCE=0.05;
DEFINE_END=1;
DEFINE_START=2;
  PLACE_GUIDE_ROT=0;
  PLACE_GUIDE_KIND=WIRE;
  PLACE_GUIDE_POWER=VDD;
  PLACE_GUIDE_LAYER=METAL3;
  PLACE_GUIDE_DIR=X;
  PLACE_GUIDE_WIDTH=0.1;
  PLACE_GUIDE_DISTANCE=0.05;
DEFINE_END=2;
DEFINE_START=3;
  PLACE_GUIDE_ROT=0;
  PLACE_GUIDE_KIND=WIRE;
  PLACE_GUIDE_POWER=VDD;
  PLACE_GUIDE_LAYER=METAL6;
  PLACE_GUIDE_DIR=Y;
  PLACE_GUIDE_WIDTH=0.3;
  PLACE_GUIDE_DISTANCE=0;
DEFINE_END=3;
DEFINE_CONDITION=((1|2)&3);
CELL_END=AAA;
```

SUPPORT APPARATUS AND DESIGN SUPPORT METHOD

CROSS-REFERENCE TO RELATED APPLICATION

This application is based upon and claims the benefit of priority of the prior Japanese Patent Application No. 2017-169612, filed on Sep. 4, 2017, the entire contents of which are incorporated herein by reference.

FIELD

The embodiments discussed herein are related to a design support apparatus and a design support method.

BACKGROUND

In large scale integrated circuit (LSI) design of the related art, components having certain circuit functions, which are called cells, are combined to design more complicated circuit functions. The cells are created as components by a cell designer and are provided as a library to an LSI designer. The LSI designer appropriately arranges the cells provided by the cell designer to design an LSI. In this LSI design, a final cell arrangement is decided after revision such as layout change.

In the related art, as a technique related to the revision of the LSI design, a method of changing the design of a semiconductor integrated circuit has been known in which an area for additional wiring is secured by performing already wired compaction in order to secure an area required for a wiring to be newly added according to a layout change.

Related techniques are disclosed in, for example, Japanese Laid-Open Patent Publication No. 02-165654.

SUMMARY

According to an aspect of the invention, a design support apparatus includes a memory, and a processor coupled to the memory and the processor configured to obtain an arrangement target cell, and arrange the arrangement target cell at a position satisfying a condition of an arrangement position recommended for each cell when the arrangement target cell is arranged, based on definition information for defining the condition.

The object and advantages of the disclosure will be realized and attained by means of the elements and combinations particularly pointed out in the claims.

It is to be understood that both the foregoing general description and the following detailed description are exemplary and explanatory and are not restirctive of the disclosure, as claimed.

BRIEF DESCRIPTION OF DRAWINGS

FIG. 6 is an explanatory view for explaining the library definition of a recommended position;

DESCRIPTION OF EMBODIMENTS

Figure 1:
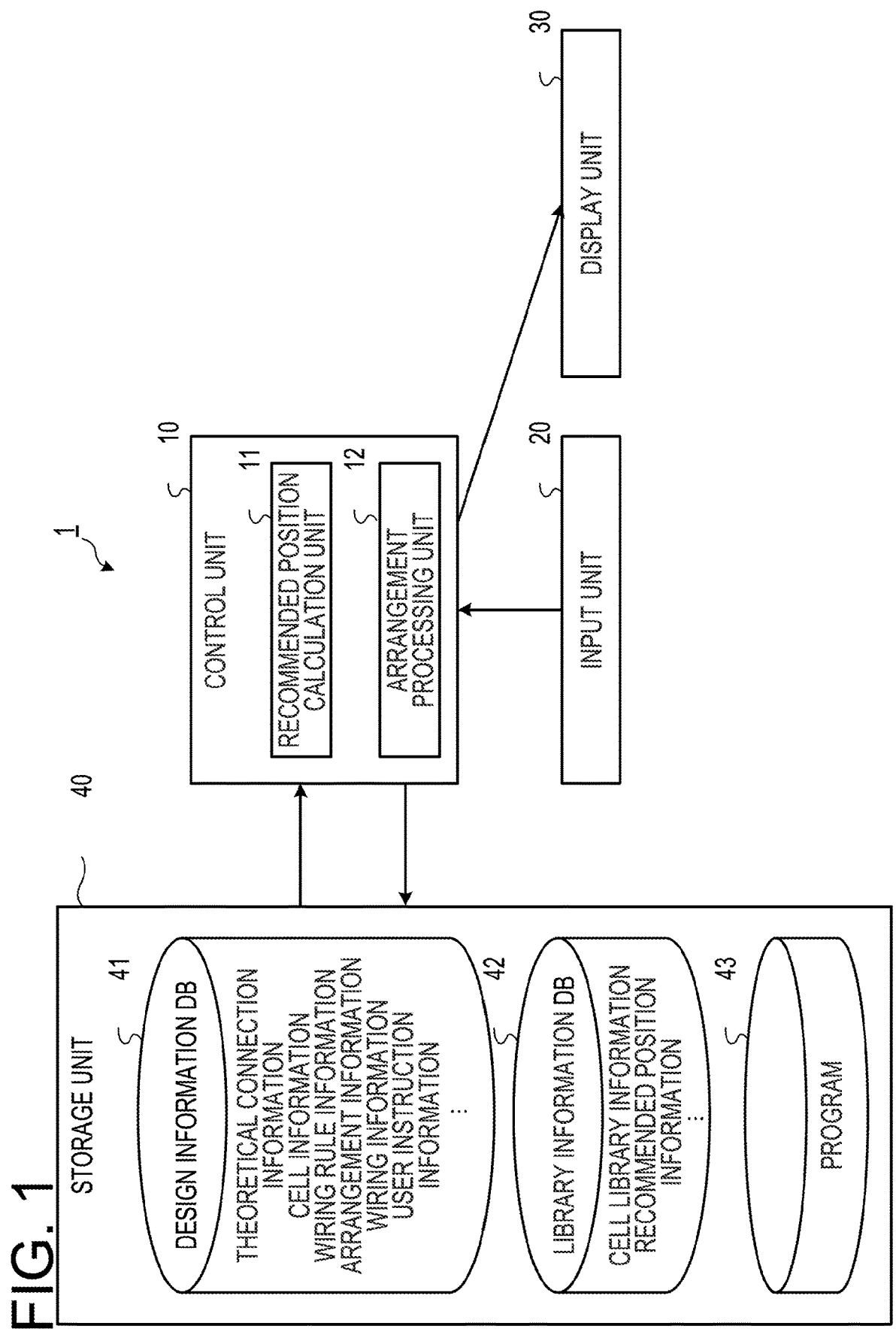
FIG. 1 is a block diagram illustrating an example of the functional configuration of a design support apparatus according to an embodiment.

The above-described technique of the related art is to secure an area related to changing the layout of cell arrangement by logic change. However, in the layout change when there is a cell revision by a cell designer, an interference error may occur between the power supply wiring and the cell. This may make it difficult to design a circuit so that no interference error occurs between the power supply wiring and the cell.

Hereinafter, an embodiment of a technology that makes it easy to design a circuit will be described with reference to the drawings. In the embodiment, the components having the same function are denoted by the same reference numerals, and explanation thereof will not be repeated. It should be noted that a design support apparatus, a design support program and a design support method described in the following embodiments are merely examples but are not intended to limit the embodiments. Further, the following embodiments may be used in proper combination unless contradictory.

FIG. 1 is a block diagram illustrating an example of the functional configuration of a design support apparatus according to an embodiment. The design support apparatus 1 illustrated in FIG. 1 is an information processing apparatus that allows an LSI designer to make circuit design to design an LSI by appropriately arranging cells provided from a cell designer. The design support apparatus 1 may be, for example, a personal computer (PC). As illustrated in FIG. 1, the design support apparatus 1 includes a control unit 10, an input unit 20, a display unit 30 and a storage unit 40.

The control unit 10 is a central processing unit (CPU) and executes a process related to circuit design by reading out and executing a program 43 related to the circuit design from the storage unit 40. Specifically, the control unit 10 provides functions as a recommended position calculation unit 11 and an arrangement processing unit 12.

The input unit 20 inputs various kinds of information to the control unit 10. For example, the input unit 20 receives an instruction from a user such as an LSI designer or a cell designer, acquires various kinds of information from an external device by communication according to the received instruction, and inputs the acquired various kinds of information to the control unit 10. For example, the input unit 20 may be an operation reception device such as a mouse or a keyboard.

For example, the input unit 20 receives a selection of cells to be arranged in the circuit design, and inputs the received contents to the control unit 10. That is, the input unit 20 is an example of a selection unit. In addition, the input unit 20 receives an operation related to an arrangement position of cells to be arranged in an arrangement screen on which the cells are arranged, and inputs the received operation contents to the control unit 10. That is, the input unit 20 is an example of an operation unit.

The display unit 30 is a liquid crystal display (LCD) or a cathode ray tube (CRT) and displays various kinds of information under control of the control unit 10. For example, the display unit 30 displays an arrangement screen on which cells are arranged in the circuit design.

The storage unit 40 is a hard disk drive (HDD) and stores various kinds of information. For example, the storage unit 40 stores a design information DB 41, a library information DB 42 and a program 43.

The design information DB 41 is a database storing various kinds of information related to circuit design for a circuit to be designed. Specifically, the design information DB 41 stores information related to circuit design such as theoretical connection information, cell information, wiring rule information, arrangement information, wiring information, and user instruction information of circuits to be designed.

For example, the theoretical connection information is information indicating a connection relationship by wiring routes (nets) of cells arranged in a circuit. The cell information is information related to cells arranged in a circuit and is described with information read out from cell library information of the library information DB 42 as the cells to be arranged. The wiring rule information is information indicating a mask design rule for forming a wiring route in the circuit. The arrangement information is information indicating the arrangement positions of elements such as cells arranged in the circuit. The wiring information is information indicating wiring between elements such as cells arranged in the circuit and includes, for example, wiring width information and Via information. The user instruction information is information instructed by a user such as an LSI designer or a cell designer in designing.

The library information DB 42 is a database storing information on various cells designed by a cell designer as a library. An LSI designer designs a circuit by selecting cells to be arranged among various kinds of cells formed into a library as the library information DB 42 and arranging them in the circuit.

Specifically, the library information DB 42 stores cell library information and recommended position information for each cell designed by the cell designer. For example, the cell library information is information related to cells formed into a library such as a circuit configuration, a terminal position and a prohibition position of power supply wiring. The recommended position information is information defining the condition of an arrangement position recommended (also referred to as a recommended position) when cells are arranged in circuit design. That is, the recommended position information is an example of definition information.

The recommended position calculation unit 11 calculates a recommended position for each cell (library cell) stored as a library in the library information DB 42. Next, based on the calculated recommended position, the recommended position calculation unit 11 generates recommended position information to be the condition of the recommended position, and stores it in the library information DB 42.

Figure 2:
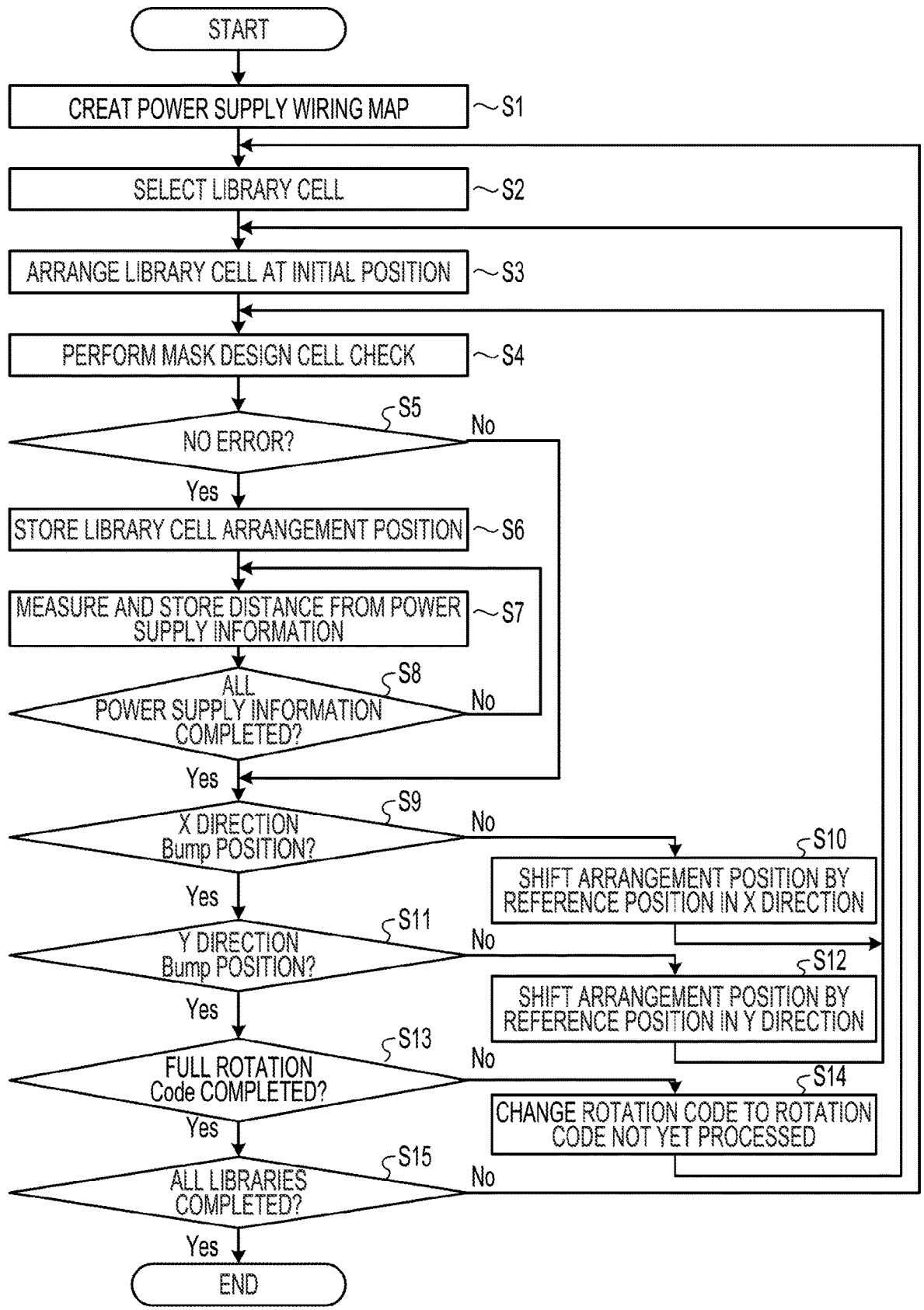
FIG. 2 is a flow chart illustrating a recommended position generating process.

FIG. 2 is a flow chart illustrating a recommended position generating process. As illustrated in FIG. 2, when the process is started, the recommended position calculation unit 11 creates a power supply wiring map in a circuit based on the wiring information of the design information DB 41 (S1). Next, the recommended position calculation unit 11 selects a processing target library cell among library cells stored as a library in the library information DB 42, and acquires cell library information of the processing target library cell (S2).

Next, the recommended position calculation unit 11 arranges the processing target library cell at a predetermined initial position in the circuit in which the power supply wiring map is created (S3). Specifically, the recommended position calculation unit 11 arranges the processing target library cell at the initial positions in the X direction and the Y direction. The rotational direction of the library cell is set to an initial value (for example, 0) of rotation codes (0 degrees=0, 90 degrees=1,180 degrees=2 and 270 degrees=3) corresponding respectively to rotations of 0 degree, 90 degrees, 180 degrees and 270 degrees.

Next, the recommended position calculation unit 11 checks the mask design rule based on the wiring rule information of the design information DB 41 and the cell library information of the processing target library cell (S4). Specifically, when the processing target library cell is arranged at a predetermined position, the recommended position calculation unit 11 checks whether or not the power wiring of the mask design and the prohibition position of the power wiring in the cell library overlap (interfere with) each other. That is, in S4, it is checked whether or not there is an interference error between the processing target library cell and the power supply wiring.

Next, the recommended position calculation unit 11 determines whether or not there is an error in the rule check of S4 (S5). When there is an error (NO in S5), that is, when there is an interference error between the processing target library cell and the power supply wiring, the recommended position calculation unit 11 advances the process to S9.

When there is no error (YES in S5), the recommended position calculation unit 11 stores the arrangement position of the processing target library cell in a memory (S6). Thus, the recommended position calculation unit 11 stores in the memory the recommended position without an interference error between the processing target library cell and the power supply wiring.

Next, the recommended position calculation unit 11 measures power source information in the circuit, that is, a distance between the power supply wiring of the mask design and the cell, and stores it in the memory (S7). Thus, the recommended position calculation unit 11 stores in the memory the distance between the power supply wiring and the cell at the recommended position of the processing target library cell as the condition of the recommended position.

Next, the recommended position calculation unit 11 determines whether or not the operation S7 of measuring and storing the distance has ended for all the power source information (S8). When the operation S7 has not been ended (NO in S8), the recommended position calculation unit 11 returns the process to S7.

When the operation S7 has been ended for all the power supply information (YES in S8), the recommended position calculation unit 11 determines whether or not the processing target library cell is at a Bump position (repetitive minimum unit of the power supply wiring) in the X direction (S9). When it is not at a Bump position in the X direction (NO in S9), the recommended position calculation unit 11 shifts the arrangement position of the processing target library cell by a predetermined reference position in the X direction (S10) and returns the process to S4.

When it is at a Bump position in the X direction (YES in S9), the recommended position calculation unit 11 determines whether or not the processing target library cell is at a Bump position in the Y direction (S11). When it is not at the Bump position in the Y direction (NO in S11), the recommended position calculation unit 11 shifts the arrangement position of the processing target library cell by a predetermined reference position in the Y direction (S12) and returns the process to S4.

When it is at a Bump position in the Y direction (YES in S11), the recommended position calculation unit 11 determines whether or not the operations S4 to S12 for the full rotation codes have been completed for the processing target library cell (S13). When the operations S4 to S12 for the full rotation codes have not been completed (NO in S13), the recommended position calculation unit 11 changes the rotation code to a rotation code not yet processed, and rotates the processing target library cell (S14), and returns the process to S3.

When the operations S4 to S12 for the full rotation codes have been completed (YES in S13), the recommended position calculation unit 11 determines whether or not processing on a library cell stored as a library in the library information DB 42 has been ended (S15). When the processing has not been ended for all the libraries (NO in S15), the recommended position calculation unit 11 returns the process to S2 and continues the process with other library cells as processing targets.

When the processing has been completed for all the libraries (YES in S15), the recommended position calculation unit 11 generates recommended position information for each library cell based on the recommended position and distance stored in the memory for each library cell and stores it in the library information DB 42. In this way, the recommended position for each library cell is created as a library and stored in the library information DB 42.

Figure 3:
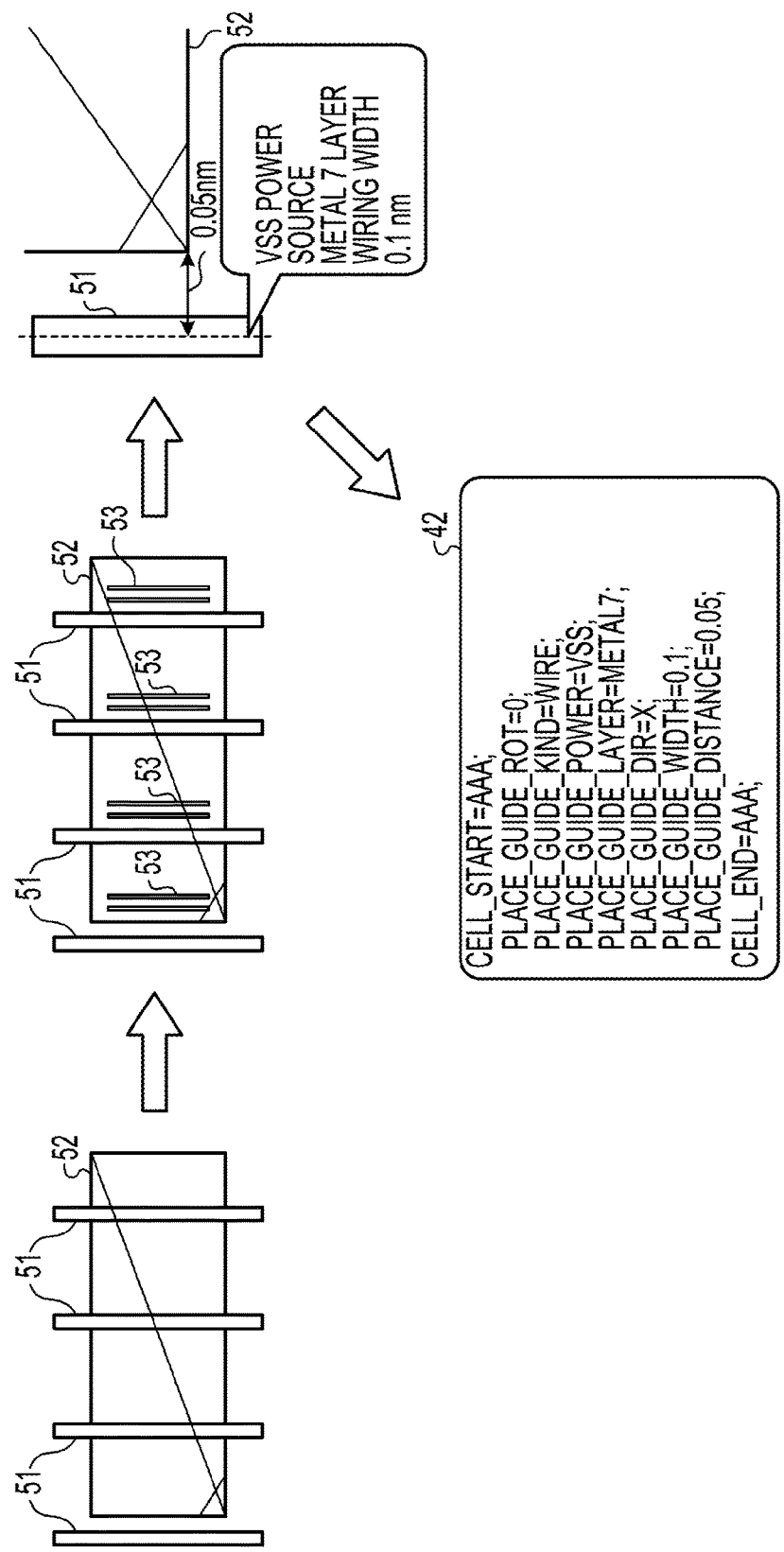
FIG. 3 is an explanatory view for explaining of creating a library of recommended positions.

FIG. 3 is an explanatory view for explaining of creating a library of a recommended position. As illustrated in FIG. 3, by performing a mask design rule check on a circuit power supply wiring 51 and a processing target cell 52, it is checked whether or not there is an interference between the power supply wiring 51 and the prohibition position 53 in the cell 52. Thus, the recommended position of the cell 52 with respect to the power supply wiring 51 and its distance (0.05 nm in the illustrated example) which do not interfere with each other are obtained, and the recommended position information defining the condition of the recommended position condition is stored in the library information DB 42.

Specifically, in the library information DB 42, the recommended position information of the cell 52 having a cell name "AAA" is described between "CELL_START" and "CELL_END." "PLACE_GUIDE_ROT" defines a rotation code at the time of arranging the cell 52. "PLACE_GUIDE_KIND" defines the type such as "WIRE" and "VIA." "PLACE_GUIDE_POWER" defines a potential such as "VSS." "PLACE_GUIDE_LAYER" defines a wiring layer such as "METAL 7." "PLACE_GUIDE_DIR" defines the distance measurement direction with the power supply information defined by "PLACE_GUIDE_KIND," "PLACE_GUIDE_POWER" and "PLACE_GUIDE_LAYER" of the cell 52. "PLACE_GUIDE_WIDTH" defines the wiring width of the power supply wiring 51. "PLACE_GUIDE_DISTANCE" defines the distance in the arrangement direction between the power supply wiring 51 and the cell 52.

In the illustrated example, the conditions defined for the recommended position of the cell 52 are that the rotation code is "0," the potential is VSS, the wiring layer is METAL 7, the wiring width is 0.1 nm, and the distance in the wiring direction (X direction) between the power supply wiring 51 and the cell 52 is 0.05 nm.

Returning to FIG. 1, in the circuit design, the arrangement processing unit 12 executes an arranging process related to arrangement of an arrangement target cell selected by an operation input in the arrangement processing unit 12 among library cells of the library information DB 42. Specifically, the arrangement processing unit 12 arranges an arrangement target cell at a position that satisfies the condition defined in the recommended position information, based on the recommended position information of the arrangement target cell, which is acquired from the library information DB 42.

Figure 4:
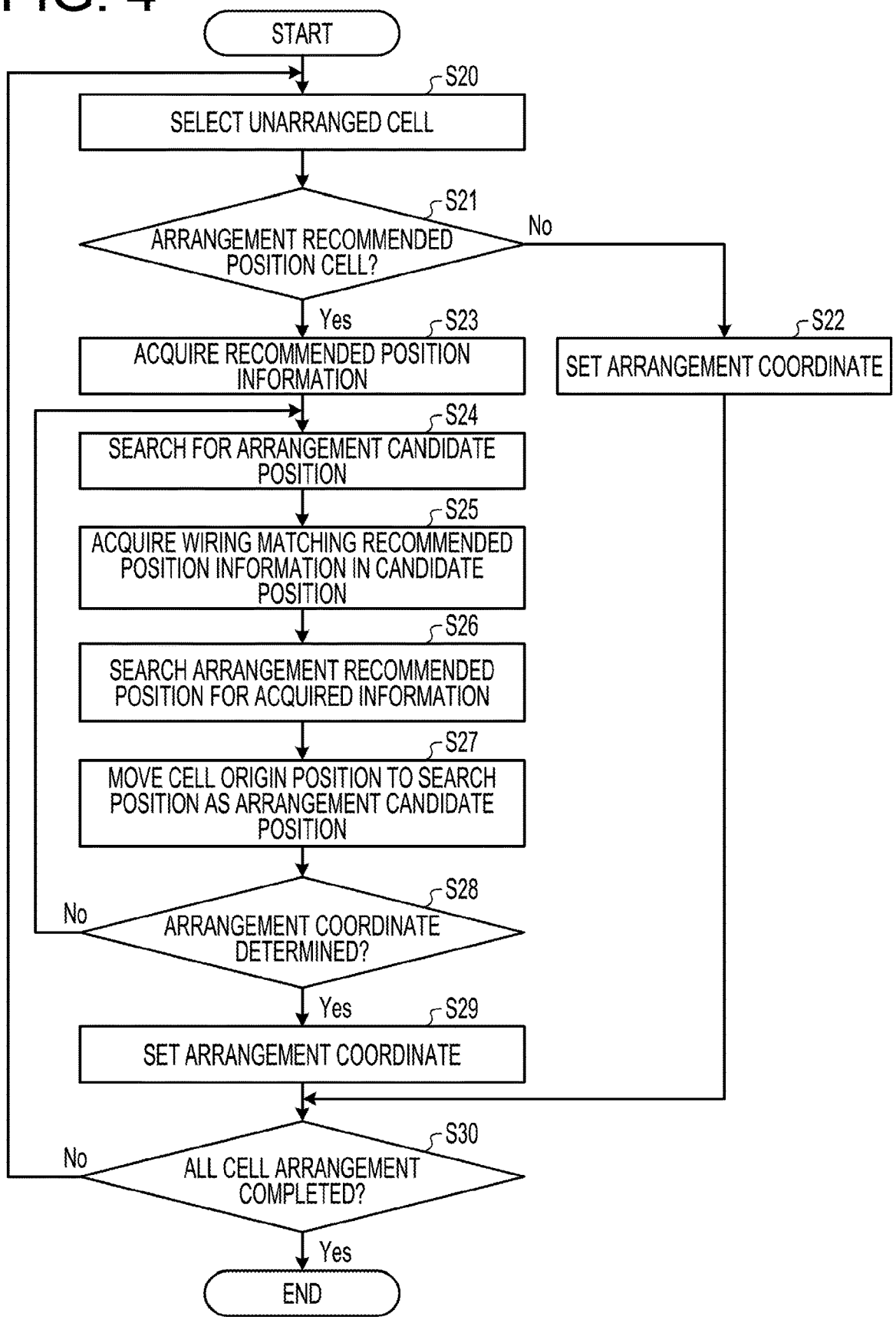
FIG. 4 is a flow chart illustrating an example of an arranging process.

FIG. 4 is a flow chart illustrating an example of an arranging process. As illustrated in FIG. 4, when the arranging process is started, the arrangement processing unit 12 receives a selection of an unarranged cell among the library cells of the library information DB 42 by an operation input at the input unit 20 (S20).

Next, the arrangement processing unit 12 checks the presence/absence of the recommended position information on the cell selected by referring to the library information DB 42, and determines whether or not the selected cell is the arrangement recommended position cell for which the condition on the recommended position is defined (S21).

When the condition on the recommended position is not defined and the selected cell is not the arrangement recommended position cell (NO in S21), the arrangement processing unit 12 sets the arrangement coordinates of the cell at the coordinates set by an operation input at the input unit 20 (S22) and advances the process to S30.

When the selected cell is the arrangement recommended position cell for which the condition on the recommended position is defined (YES in S21), the arrangement processing unit 12 refers to the library information DB 42 to acquire the recommended position information on the selected cell (S23).

Figure 5:
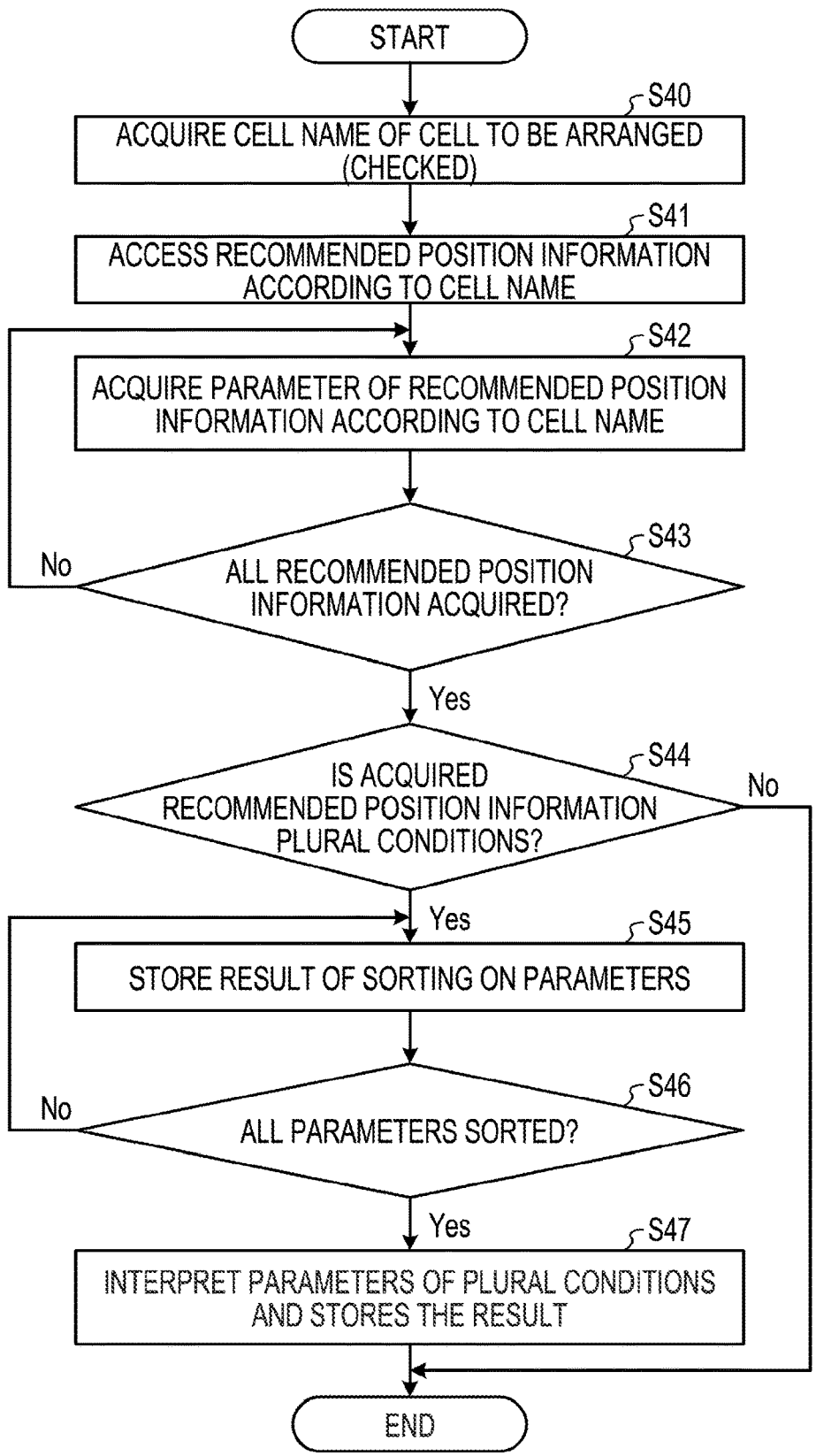
FIG. 5 is a flow chart illustrating an example of a recommended position information acquiring process.

FIG. 5 is a flow chart illustrating a recommended position information acquiring process. As illustrated in FIG. 5, when the process is started, the arrangement processing unit 12 acquires the cell name of a cell selected and arranged (checked) (S40). Next, the arrangement processing unit 12 refers to "CELL_START" to access the recommended position information corresponding to the cell name (S41).

Next, the arrangement processing unit 12 sequentially acquires parameters of the recommended position information corresponding to the cell name, which are described between "CELL_START" and "CELL_END" (S42). Next, the arrangement processing unit 12 determines whether or not all the recommended position information up to "CELL_END" has been acquired (S43). If not (NO in S43), the arrangement processing unit 12 returns the process to S42.

When all the recommended position information has been acquired (YES in S43), the arrangement processing unit 12 determines whether or not the acquired recommended position information has a plurality of conditions (S44).

FIG. 6 is an explanatory view for explaining the library definition of a recommended position. As illustrated in FIG. 6, there are one condition of the recommended position of a cell with respect to the wiring and via as in the recommended position information 42a and 42b, and there are a plurality of conditions as in the recommended position information 42c. For example, in the recommended position information 42c, three conditions of "1" to "3" of "DEFIN_START" are defined for the cell name "AAA." In addition, whether the conditions "1" to "3" are the mutual AND conditions or the mutual OR conditions is defined in "DEFIN_CONDITION" of the recommended position information 42c. In the illustrated example, the plurality of conditions "1" to "3" are defined as satisfying ("1" or "2") and "3."

When the acquired recommended position information does not have a plurality of conditions (YES in S44), the arrangement processing unit 12 ends the process. When it has a plurality of conditions (YES in S44), the arrangement processing unit 12 stores in the memory the result of sorting on parameters in the order of interpreting the AND condition or the OR condition (S45). Next, the arrangement processing unit 12 determines whether or not all the parameters have been sorted (S46). When all the parameters have not been sorted (NO in S46), the arrangement processing unit 12 returns the process to S45.

Next, the arrangement processing unit 12 interprets the parameters of the plurality of conditions stored in the memory based on the AND condition or the OR condition and stores the result in the memory (S47). Thus, the recommended position information satisfying the plurality of conditions is stored in the memory.

Returning to FIG. 4, subsequent to S23, the arrangement processing unit 12 searches for arrangement candidate positions that satisfy the conditions of the acquired recommended position information (S24). Next, the arrangement processing unit 12 performs an acquisition process to acquire wirings matching the recommended position information within the candidate positions (S25).

Figure 7:
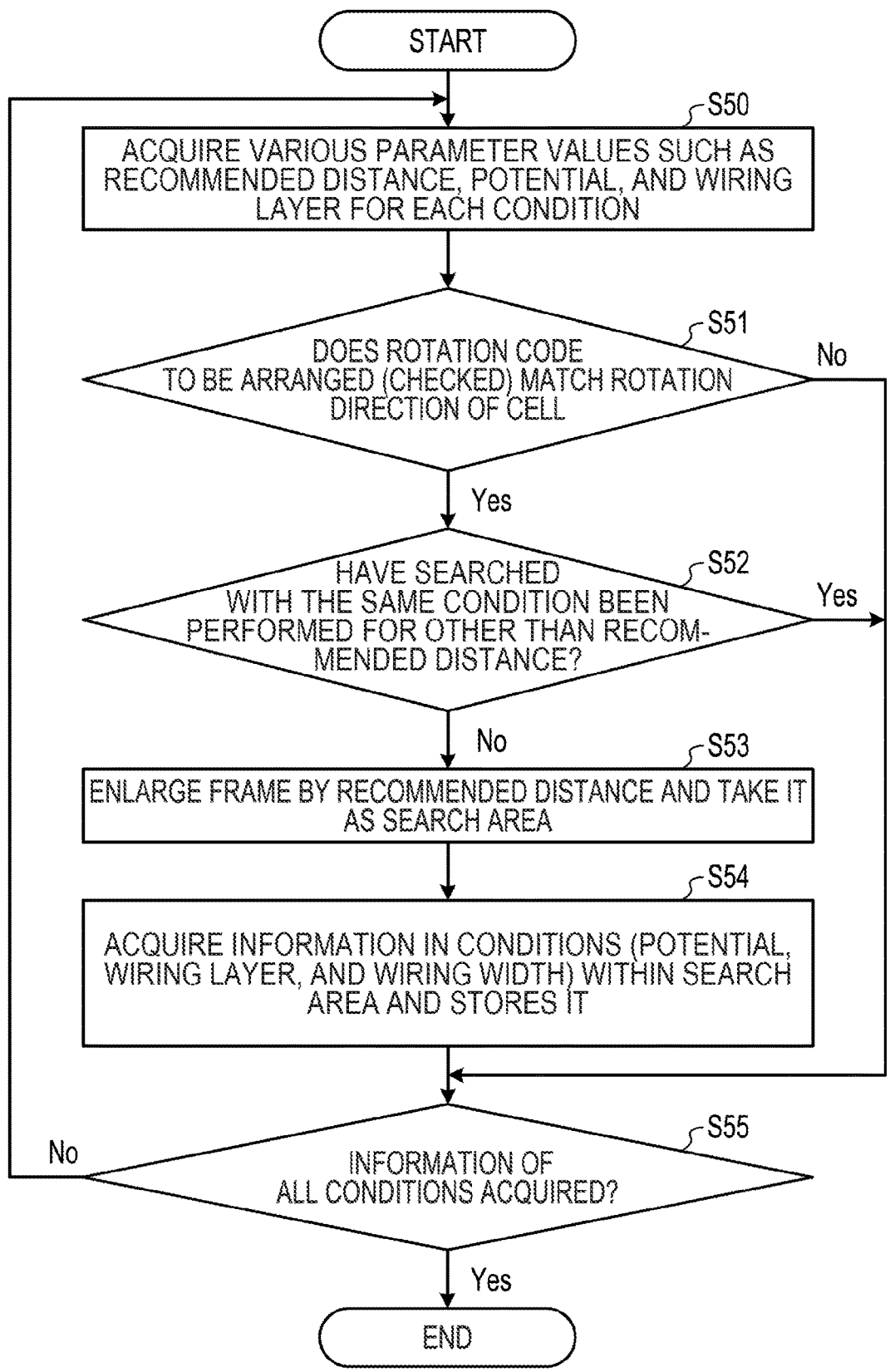
FIG. 7 is a flow chart illustrating a process of acquiring a wiring.

FIG. 7 is a flow chart illustrating a process of acquiring wirings. As illustrated in FIG. 7, when the process is started, the arrangement processing unit 12 acquires various parameters such as a recommended distance (a distance from the power supply wiring 51), a potential, and a wiring layer for each condition in the recommended position information (S50).

Next, the arrangement processing unit 12 determines whether or not a rotation code to be arranged (checked) included in each of the acquired parameters matches the rotation direction of the cell (S51). When they do not match (NO in S51), the arrangement processing unit 12 advances the process to S55.

When they match (YES in S51), the arrangement processing unit 12 determines whether or not a search with the same condition has been performed for other than the recommended distance (S52). When a search with the same condition has been performed (YES in S52), the arrangement processing unit 12 suppresses re-search under the same condition by advancing the process to S55.

When a search with the same condition has not been performed (NO in S52), the arrangement processing unit 12 enlarges the cell frame by the recommended distance and takes the enlarged cell frame as a search area (S53). Next, the arrangement processing unit 12 acquires circuit information such as wirings in the conditions (potential, wiring layer, and wiring width) within the search area from the design information DB 41 and stores it in the memory (S54).

Next, the arrangement processing unit 12 determines whether or not information on all the conditions in the recommended position information has been acquired (S55). If not acquired (NO in S55), the arrangement processing unit 12 returns the process to S50. If acquired (YES in S55), the arrangement processing unit 12 ends the process.

Returning to FIG. 4, the arrangement processing unit 12 performs a search process to search for a recommended position at which a cell is arranged with respect to the information acquired at S23 and S25 (S26).

Figure 8A:
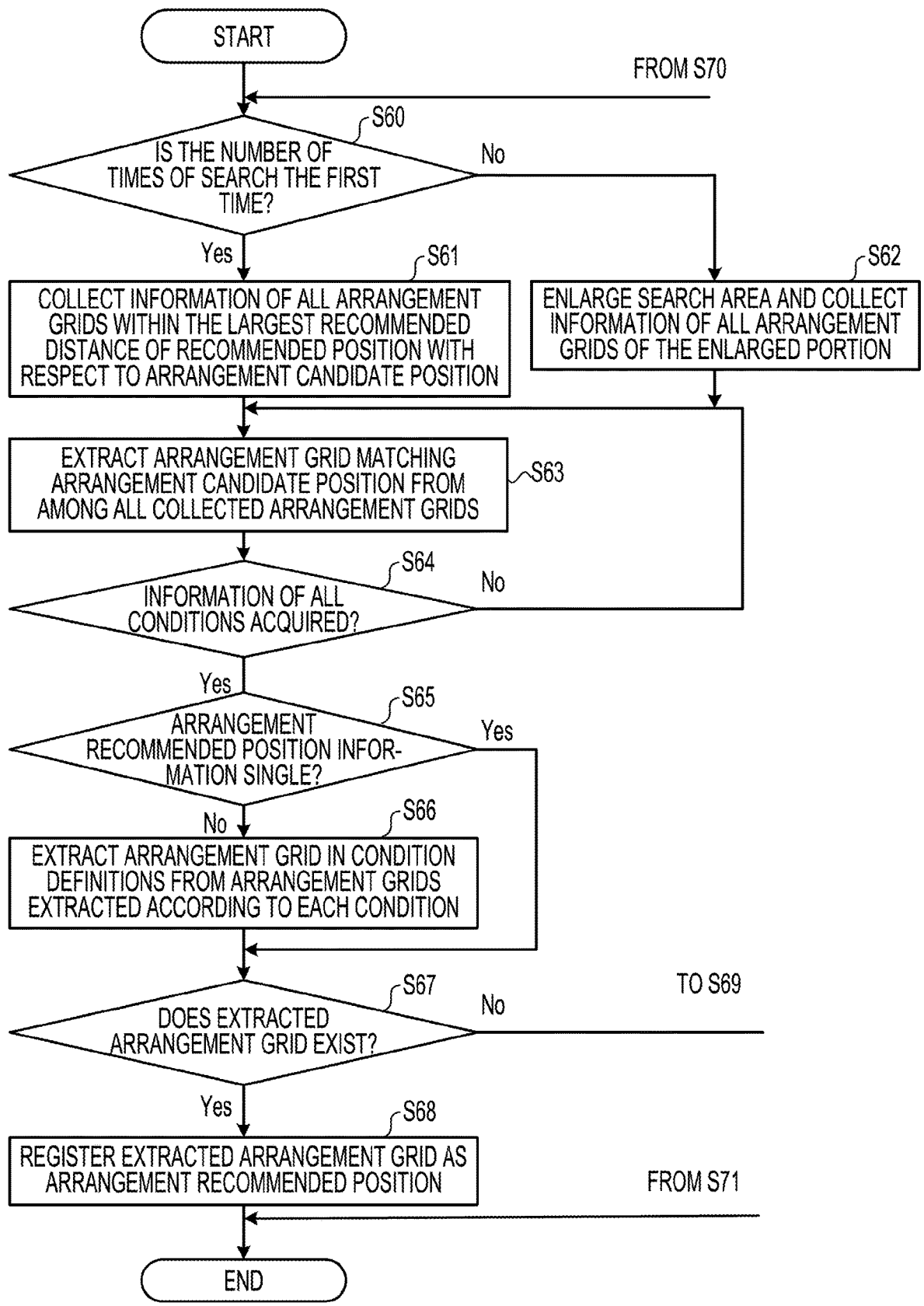
FIGS. 8A and 8B are a flow chart illustrating a recommended position searching process.
Figure 8B:
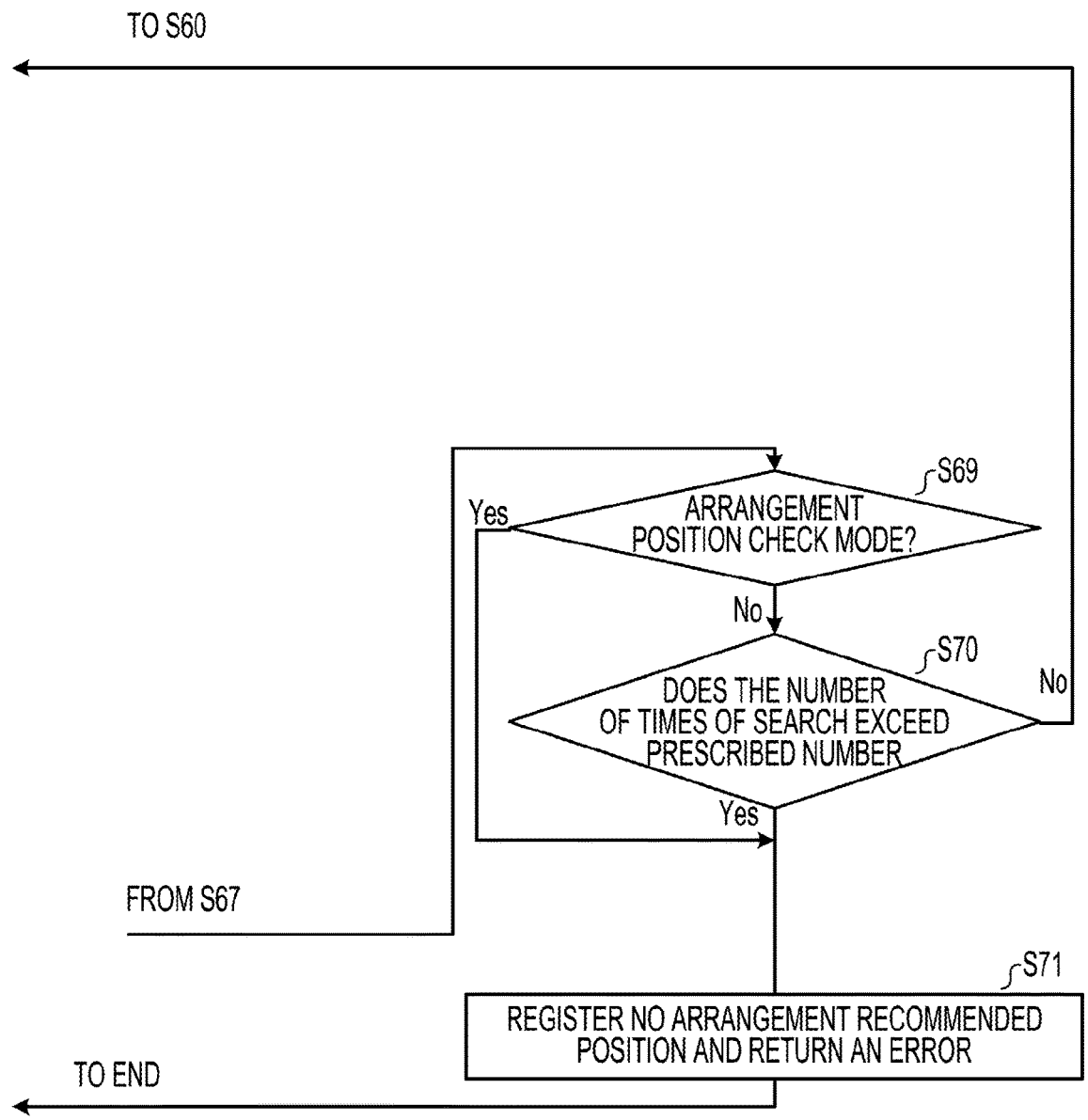

FIGS. 8A and 8B are a flow chart illustrating a recommended position searching process. As illustrated in FIGS. 8A and 8B, when the process is started, the arrangement processing unit 12 determines whether or not the number of times of search is the first time (S60). For example, the initial process makes an affirmative determination when the number of times of search is the first time.

When the number of times of search is the first time (YES in S60), the arrangement processing unit 12 collects information of all arrangement grids within the largest recommended distance of the recommended position with respect to the arrangement candidate positions (S61). When the number of times of search is not the first time (NO in S60), the arrangement processing unit 12 enlarges the search area and collects information of all the arrangement grids of the enlarged portion (S62).

Subsequent to S61 and S62, the arrangement processing unit 12 extracts a grid matching the arrangement candidate position from among all the collected grids (S63). Next, the arrangement processing unit 12 determines whether or not information of all the conditions for the recommended position has been acquired (S64). If not acquired (NO in S64), the arrangement processing unit 12 returns the process to S63.

When information of all the conditions has been acquired (YES in S64), the arrangement processing unit 12 determines whether or not the information (conditions) of the recommended position of the cell arrangement is single (S65). When it is single (YES in S65), the arrangement processing unit 12 advances the process to S67.

When it is not single (NO in S65), the arrangement processing unit 12 extracts an arrangement grid in the plurality condition definitions from the arrangement grids extracted according to each condition (S66).

Next, the arrangement processing unit 12 determines whether or not the extracted arrangement grid exists (S67). When the extracted arrangement grid exists (YES in S67), the arrangement processing unit 12 registers the extracted arrangement grid as the recommended position of the cell arrangement (S68) and ends the process.

When the extracted arrangement grid does not exist (NO in S67), the arrangement processing unit 12 determines whether or not it is in a check mode to check whether or not the arrangement position of the cell satisfies the condition of the recommended position (S69).

When it is not in a check mode (NO in S69), the arrangement processing unit 12 determines whether or not the number of times of search exceeds a prescribed number (S70). When it does not exceed the prescribed number (NO in S70), the arrangement processing unit 12 returns the process to S60. Thus, the arrangement processing unit 12 searches for the arrangement position of the cell that satisfies the condition of the recommended position until it reaches the prescribed number.

When it is in a check mode (YES in S69) and when the number of times of search exceeds the prescribed number (YES in S70), the arrangement processing unit 12 registers no recommended position of the cell arrangement, returns an error (S71), and ends the process.

Returning to FIG. 4, subsequent to S26, the arrangement processing unit 12 moves the position of the cell origin to the search position (the recommended position registered in S68) searched by the searching process as a cell arrangement candidate position (S27).

Next, the arrangement processing unit 12 decides whether or not to determine a cell arrangement coordinate based on the presence or absence of an operation input at the input unit 20 for determining the cell arrangement position (S28). When the cell arrangement coordinate is not determined (NO in S28), the arrangement processing unit 12 returns the process to S24.

When the cell arrangement coordinate is determined (YES in S28), the arrangement processing unit 12 sets the cell arrangement coordinate to the coordinate of the moved recommendation position (S29). Next, the arrangement processing unit 12 determines whether or not arrangement of all the cells to be arranged in the circuit design has been completed (S30). When the arrangement has been completed (YES in S30), the arrangement processing unit 12 ends the process. When the arrangement has not been completed (NO in S30), the arrangement processing unit 12 returns the process to S20.

By executing the arranging process described above, the arrangement processing unit 12 moves a cell for which its arrangement position on the arrangement screen of the display unit 30 is manipulated to a position that satisfies the condition of the recommended position information.

Figure 9:
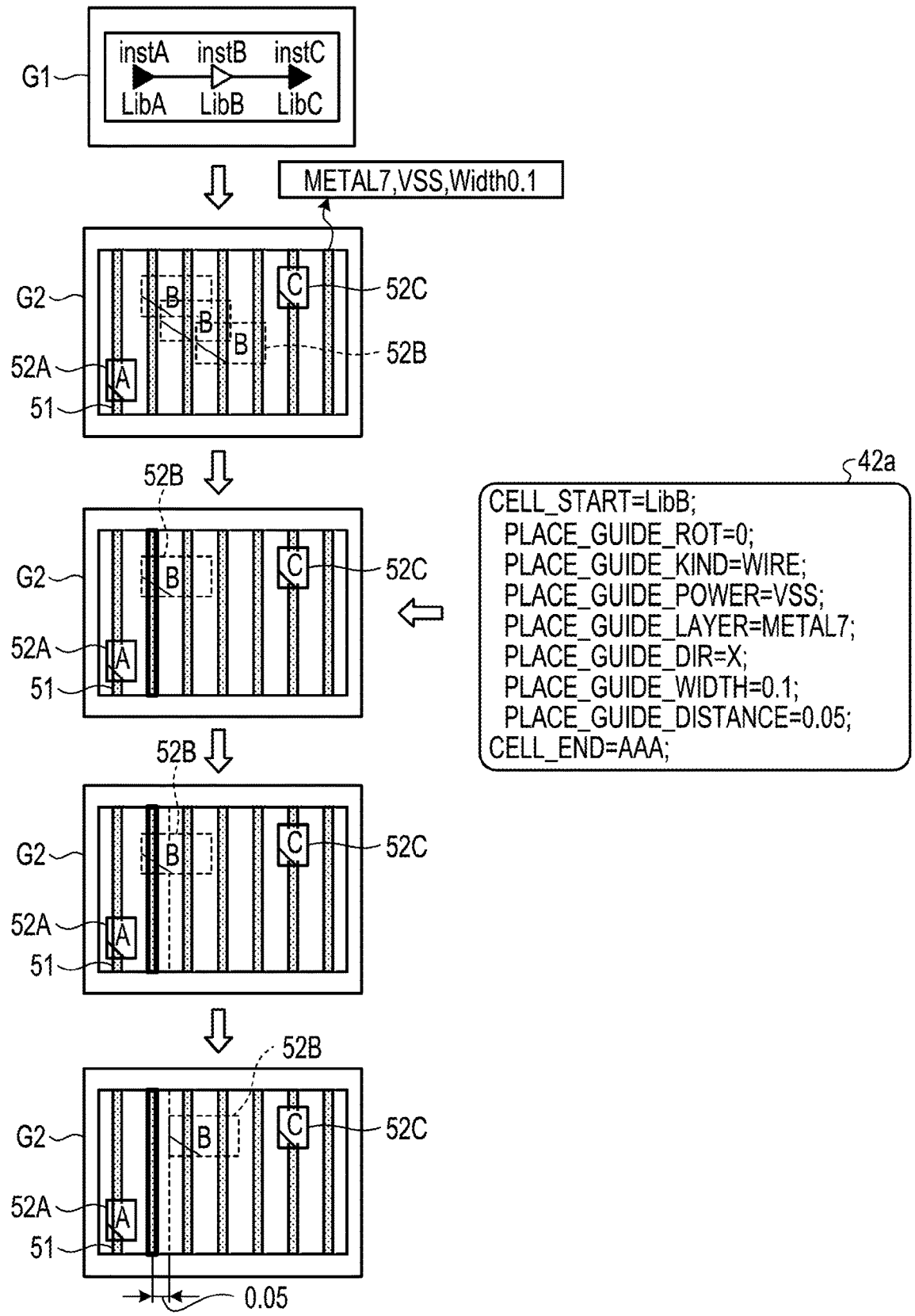
FIG. 9 is an explanatory view for explaining movement of a cell to a recommended position.

FIG. 9 is an explanatory view for explaining cell movement to a recommended position. As illustrated in FIG. 9, it is assumed that a cell of "LibB" is selected on a selection screen G1 for selecting an unarranged cell. In this case, on an arrangement screen G2, the arrangement position of a cell 52B related to "LibB" is manipulated by a user's operation input at the input unit 20. On the arrangement screen G2, the cells 52A and 52C are already arranged cells.

Here, by performing the arranging process, the arrangement processing unit 12 arranges the cell 52B at a position away by 0.05 nm from the center of the power supply wiring 51 in the X direction based on recommended position information 42a on "LibB." In this way, the design support apparatus 1 may arrange the cell 52B at a recommended position at which no interference error occurs between the power supply wiring and the cell, thereby making it possible for the user to easily perform the circuit design.

In recent years, the LSI design has been miniaturized with advance in semiconductor process technology, making it possible to achieve higher density, higher frequency and lower voltage. For this reason, an LSI designer faces problems such as an increase in current amount, an increase in wiring current density, a relative increase in cell leak current with respect to power consumption, an increase in IR drop, and so on.

In order to avoid these problems, the LSI designer takes measures to increase the ratio of the occupied power supply wiring to the LSI chip area. Further, the mask design rule has become complicated and it is required to clear this complicated mask design rule. In addition, the period from the start of design to its release becomes shortened to enhance the competitiveness with other companies.

From the viewpoint of the cell library, a circuit having a certain degree of collective functions is more advantageous in terms of area and timing to create the circuit by using a custom cell created according to the specifications rather than creating the circuit by using a standard cell already existing as the standard specifications. Therefore, it is the main stream to create the circuit with the custom cell. On the other hand, in a design using the up-to-date process, design rule change, library change for delay calculation, and design requirement change frequently occur during designing. For this reason, revisions also occur in the cell library. In order to reflect the revision of the cell library in the LSI design, the layout change in the LSI design is also frequently carried out.

From the viewpoint of LSI design, such a custom cell is used to design a high-performance LSI. Since the custom cell has a cell size larger than that of a general standard cell, it is important to fix an arrangement position from the beginning of the design. It is also important to respond to frequent cell library modifications in a short period of time. Therefore, it is possible to arrange the cell 52B at a recommended position so that no interference error occurs between the power supply wiring and the cell, thereby making it easy to design a circuit and coping with the modification of the cell library in a short period of time.

[Arrangement of Plurality of Cells]

When a plurality of cells are selected, the arrangement processing unit 12 may arrange the selected plurality of cells. Here, details of an arranging process when the plurality of cells are selected as arrangement target cells will be described.

Figure 10A:
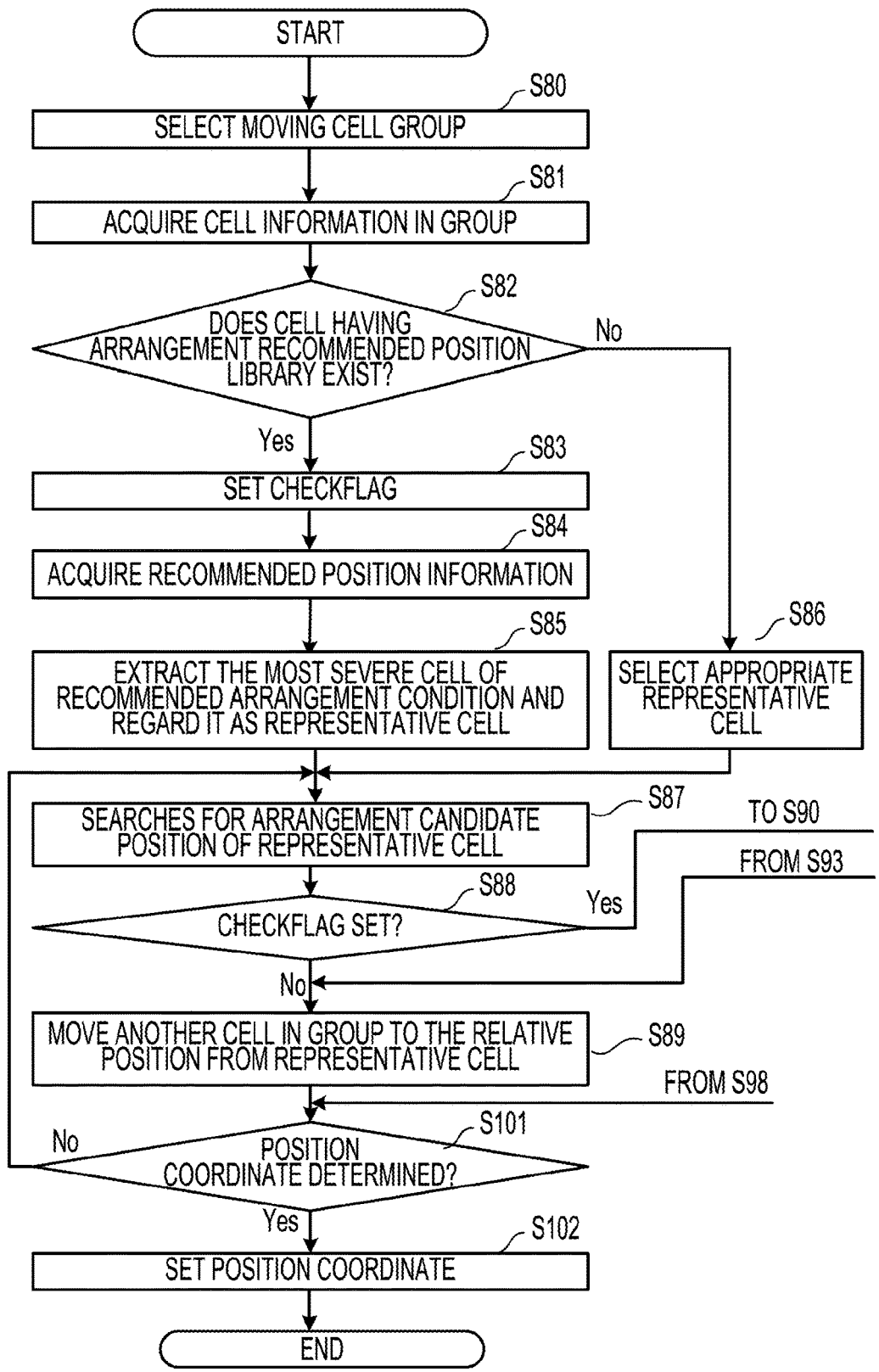
FIGS. 10A and 10B are a flow chart illustrating an example of a process of arranging a plurality of cells.
Figure 10B:
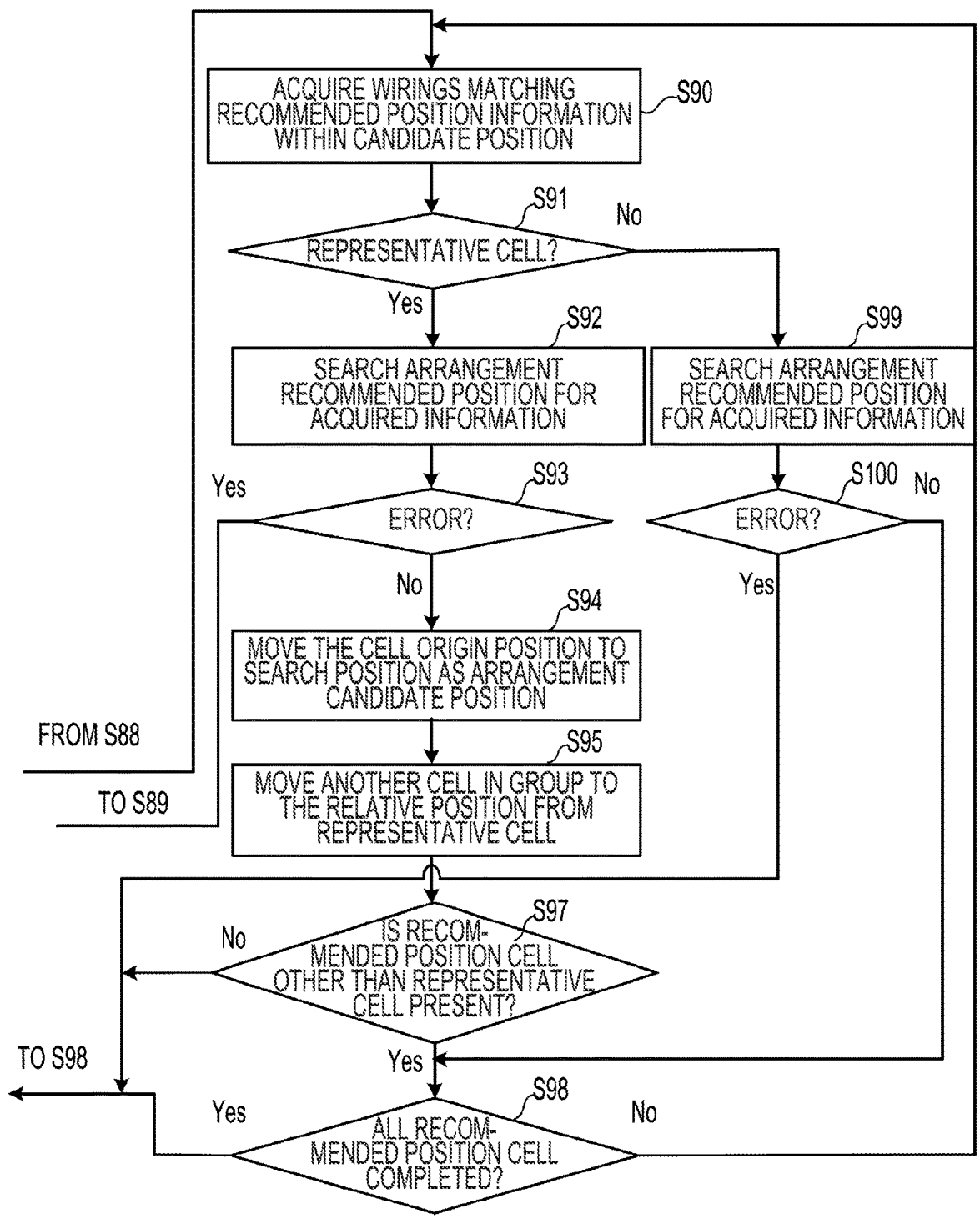

FIGS. 10A and 10B are a flow chart illustrating an example of a process of arranging a plurality of cells. As illustrated in FIGS. 10A and 10B, when the process is started, the arrangement processing unit 12 receives a selection of a moving cell group (a plurality of cells to be arranged) by an operation input by the input unit 20 (S80).

Next, the arrangement processing unit 12 acquires information on the cells in the selected group from the library information DB 42 (S81). Next, the arrangement processing unit 12 determines whether or not a cell having a library (recommended position information) corresponding to a recommended arrangement position exists in the group (S82). When none of the cells has a library (NO in S82), the arrangement processing unit 12 appropriately (arbitrarily) selects a representative cell from the cells in the group (S86) and advances the process to S87.

When there is a cell having a library (YES in S82), the arrangement processing unit 12 sets CheckFlag (S83). Next, the arrangement processing unit 12 acquires the recommended position information related to the cells in the group in the same manner as in S23 (S84).

Next, the arrangement processing unit 12 extracts the most severe cell of the recommended arrangement condition in the recommended position information and regards it as the representative cell (S85). Specifically, the arrangement processing unit 12 regards a cell having a larger number of AND conditions and the narrowest distance condition range as the representative cell.

Next, the arrangement processing unit 12 searches for an arrangement candidate position that satisfies the condition of the recommended position information of the representative cell (S87). Next, the arrangement processing unit 12 determines whether or not CheckFlag set in S83 is set (S88). When it is not set (NO in S88), the arrangement processing unit 12 moves another cell in the group to the relative position from the representative cell (S89).

When it is set (YES in S88), the arrangement processing unit 12 performs the acquiring process to acquire wirings matching the recommended position information within the candidate position as in S25 (S90).

Next, the arrangement processing unit 12 determines whether or not the processing target cell is the representative cell (S91). When it is the representative cell (YES in S91), the arrangement processing unit 12 performs a searching process to search for a recommended position at which a cell is arranged for the information acquired in S84 and S90, as in S26 (S92).

Next, the arrangement processing unit 12 determines whether or not there is an error in the searching process (S93). When there is an error (YES in S93), the arrangement processing unit 12 advances the process to S89.

When there is no error (NO in S93), the arrangement processing unit 12 moves the position of the cell origin to the search position searched as a cell arrangement candidate position by the searching process (S94). Next, the arrangement processing unit 12 moves another cell in the group to the relative position from the representative cell (S95) and advances the process to S97.

When the processing target cell is not the representative cell (NO in S91), the arrangement processing unit 12 performs the searching process to search for a recommended position at which a cell is arranged for the information acquired in S84 and S90, as in S26 (S99). Next, the arrangement processing unit 12 determines whether or not there is an error in the searching process (S100). When there is an error (YES in S100), the arrangement processing unit 12 advances the process to S101. When there is no error (NO in S100), the arrangement processing unit 12 advances the process to S98.

In S97, the arrangement processing unit 12 determines whether or not there is a cell having the condition of a recommended position other than the representative cell. When there is no cell (NO in S97), the arrangement processing unit 12 advances the process to S101. When there is a cell (YES in S97), the arrangement processing unit 12 determines whether or not the process has been completed for all the cells having the condition of the recommended position (S98). When the process has not been completed (NO in S98), the arrangement processing unit 12 returns the process to S90. When the process has been completed (YES in S98), the arrangement processing unit 12 advances the process to S101.

In S101, the arrangement processing unit 12 determines whether or not a position coordinate is determined based on the presence or absence of operation input for determining the position of the cell group at the input unit 20. When it is not determined (NO in S101), the arrangement processing unit 12 returns the process to S87. When it is determined (YES in S101), the arrangement processing unit 12 sets the position coordinate of the cell group to the coordinate of the moved recommendation position (S102) and ends the process.

[Arrangement Check]

The arrangement processing unit 12 may check whether or not the arrangement position of the cell arranged by the user's operation input of the input unit 20 satisfies the condition in the recommended position information. Details of an arrangement checking process will be described below.

Figure 11:
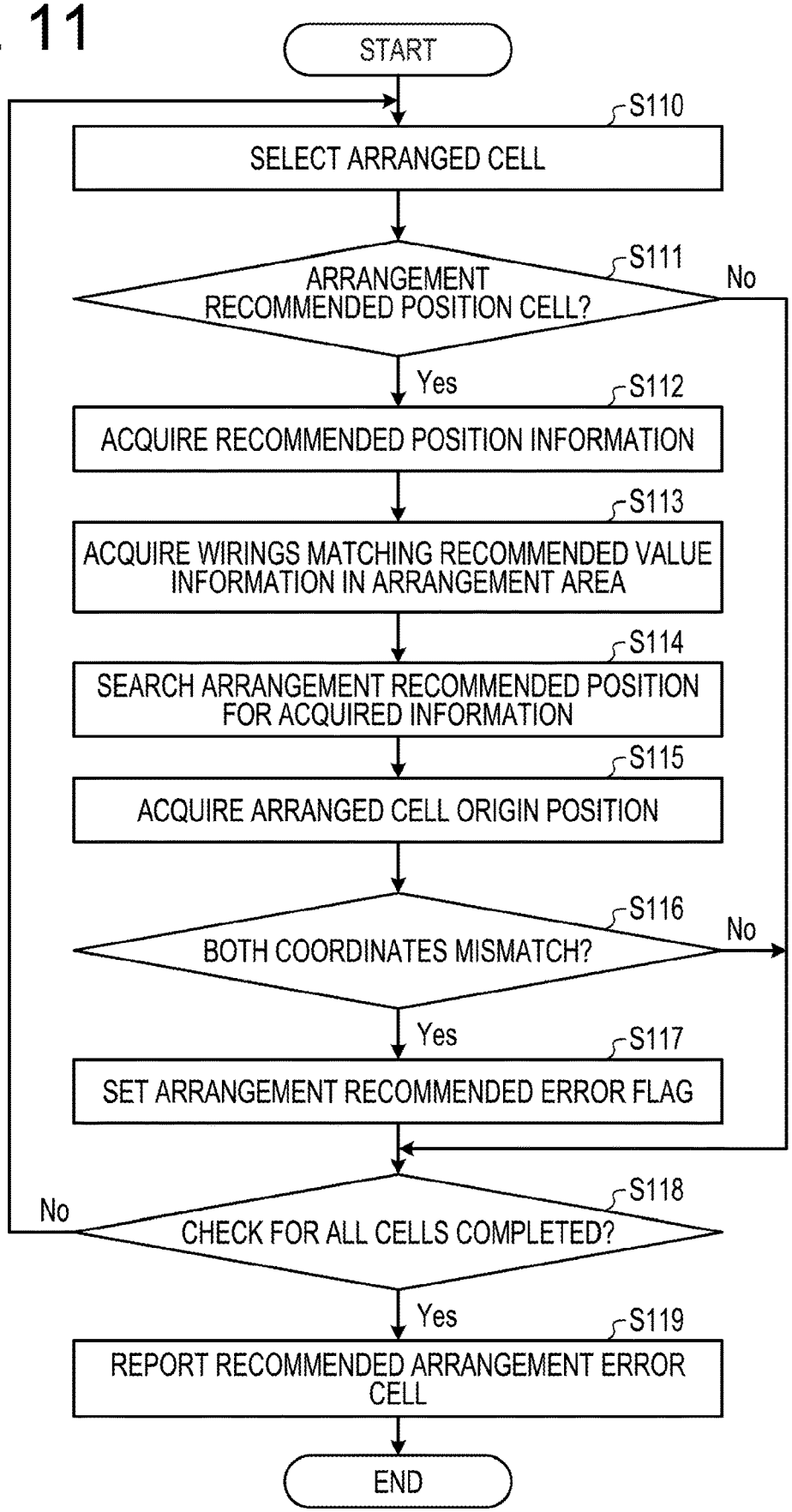
FIG. 11 is a flow chart illustrating an example of an arrangement checking process.

FIG. 11 is a flow chart illustrating an example of an arrangement checking process. As illustrated in FIG. 11, when the process is started, the arrangement processing unit 12 selects a processing target cell from the cells arranged by the user (S110).

Next, the arrangement processing unit 12 refers to the library information DB 42 to check the presence/absence of the recommended position information on the processing target cell, and determines whether or not the processing target cell is an arrangement recommended position cell for which the condition on the recommended position is defined (S111).

When the processing target cell is not an arrangement recommended position cell for which the condition on the recommended position is defined (NO in S111), the arrangement processing unit 12 advances the process to S118. When the processing target cell is an arrangement recommended position cell for which the condition on the recommended position is defined (YES in S111), the arrangement processing unit 12 refers to the library information DB 42 to acquire the recommended position information on the processing target cell as in S23 (S112).

Next, as in S25, the arrangement processing unit 12 performs the acquiring process to acquire wirings matching the recommended position information in the arrangement area of the processing target cell (S113). Next, as in S26, the arrangement processing unit 12 performs the searching process to search for a recommended position at which a cell is arranged for the information acquired in S112 and S113 (S114).

Next, the arrangement processing unit 12 acquires the origin position of the arranged cell which is the processing target cell (S115), and determines whether or not the coordinate of the searched recommended position and the origin position mismatch (S116). When they do not mismatch (NO in S116), that is, when the arrangement position of the cell arranged by the user satisfies the condition in the recommended position information, the arrangement processing unit 12 advances the process to S118.

When they mismatch (YES in S116), since the arrangement position of the cell arranged by the user does not satisfy the condition in the recommended position information, the arrangement processing unit 12 sets an arrangement recommendation error flag for the processing target cell (S117).

Next, the arrangement processing unit 12 determines whether or not the check of all the arranged cells has been completed (S118). When the check has not been completed (NO in S118), the arrangement processing unit 12 returns the process to S110. When the check has been completed (YES in S118), the arrangement processing unit 12 outputs an error report that the cell set with the arrangement recommendation error flag does not satisfy the condition in the recommended position information (S119). For example, the arrangement processing unit 12 outputs the error report to the arrangement screen G2 of the display unit 30. Thus, the user can confirm that the arrangement position of the cell arranged on the arrangement screen G2 does not satisfy the condition in the recommended position information.

[Automatic Arrangement]

The arrangement processing unit 12 may automatically arrange a cell selected by the user from the library according to the operation input of the input unit 20 at a position satisfying the conditions in the recommended position information. Details of the automatic arranging process will be described below.

Figure 12:
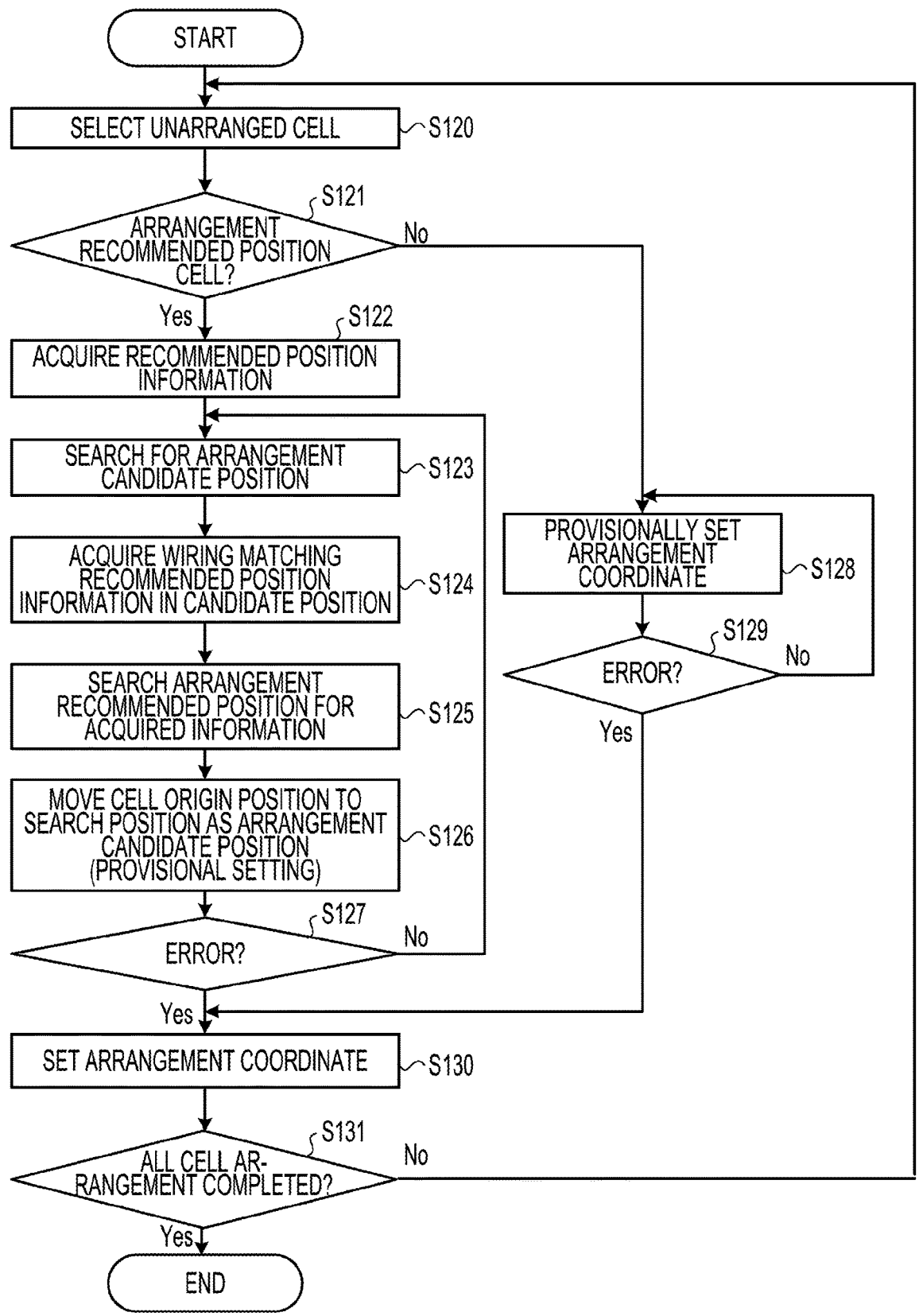
FIG. 12 is a flow chart illustrating an example of an automatic arranging process.

FIG. 12 is a flow chart illustrating an example of an automatic arranging process. As illustrated in FIG. 12, when the process is started, the arrangement processing unit 12 selects a cell not yet arranged among cells selected by the user from the library of the library information DB 42 by the operation input of the input unit 20, as a processing target cell (S120).

Next, the arrangement processing unit 12 refers to the library information DB 42 to check the presence/absence of the recommended position information on the processing target cell, and determines whether or not the processing target cell is an arrangement recommended position cell for which the condition on the recommended position is defined (S121).

When the processing target cell is not an arrangement recommended position cell for which the condition on the recommended position is defined (NO in S121), the arrangement processing unit 12 advances the process to S128. When the processing target cell is an arrangement recommended position cell for which the condition on the recommended position is defined (YES in S121), the arrangement processing unit 12 refers to the library information DB 42 to acquire the recommended position information on the processing target cell as in S23 (S122).

Next, the arrangement processing unit 12 searches for an arrangement candidate positions that satisfies the conditions of the acquired recommended position information (S123). Next, the arrangement processing unit 12 performs an acquiring process to acquire wirings matching the recommended position information within the candidate position, as in S25 (S124).

Next, the arrangement processing unit 12 performs a searching process to search a recommended position at which a cell is arranged for the information acquired in S122 and S124, as in S26 (S125). Next, the arrangement processing unit 12 moves (provisionally sets) the position of the cell origin to the search position searched by the searching process as a cell arrangement candidate position (S126).

Next, the arrangement processing unit 12 determines whether or not there is an error (for example, out of circuit) at the position of the moved cell (S127). When there is an error (NO in S127), the arrangement processing unit 12 returns the process to S123. When there is no error (YES in S127), the arrangement processing unit 12 advances the process to S130.

In S128, the arrangement processing unit 12 provisionally sets a predetermined coordinate for the processing target cell, as an arrangement coordinate, and determines whether or not there is an error (for example, out of circuit) at the provisionally set position, as in S127 (S129). When there is an error (NO in S129), the arrangement processing unit 12 returns the process to S128 to provisionally set the arrangement coordinate to another position. When there is no error (YES in S129), the arrangement processing unit 12 advances the process to S130.

In S130, the arrangement processing unit 12 sets the arrangement coordinate at the position provisionally set for the processing target cell, and determines whether or not arrangement of all the cells selected from the library has been completed (S131). When the arrangement has not been completed (NO in S131), the arrangement processing unit 12 returns the process to S120. When the arrangement has been completed (YES in S131), the arrangement processing unit 12 ends the process.

[Refining Process]

The arrangement processing unit 12 may integrate the recommended position information having a plurality of conditions into any one of the conditions in which the relative positions to the power supply wiring 51 are different. Then, the arrangement processing unit 12 arranges an arrangement target cell at a position satisfying the integrated condition.

Figure 13:
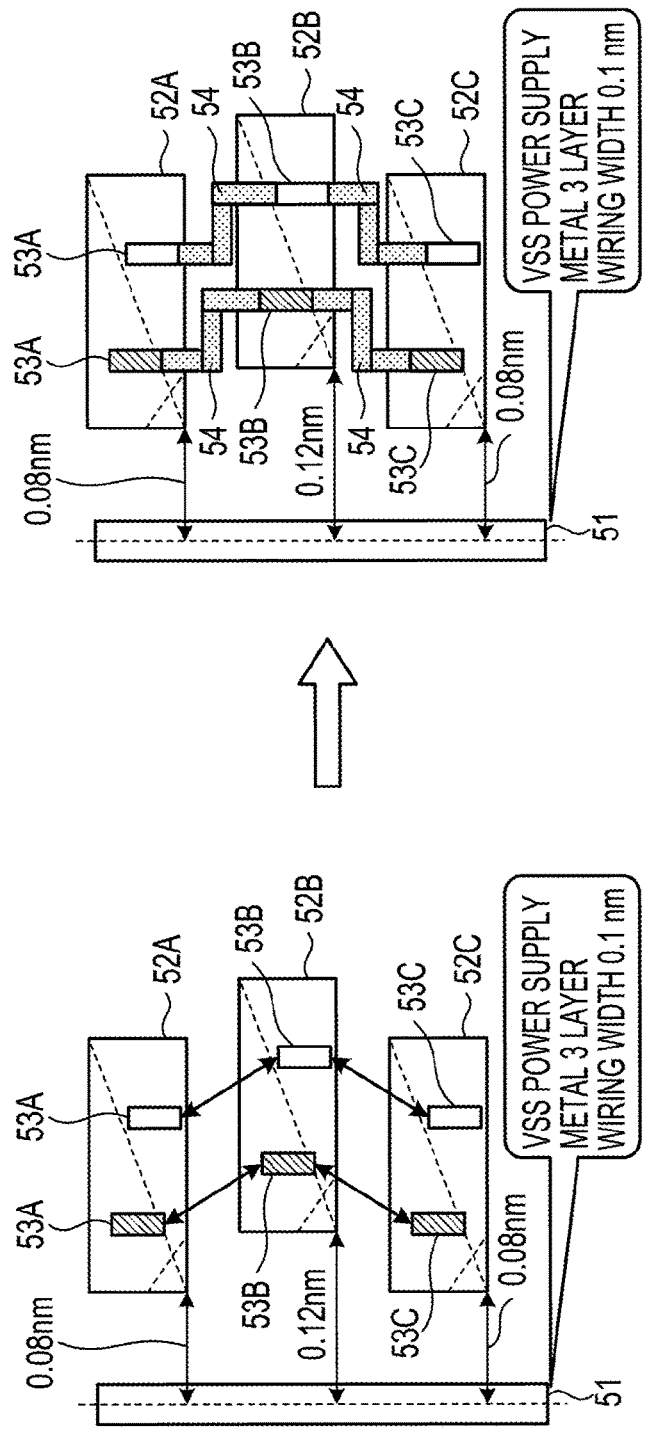
FIG. 13 is an explanatory view for explaining an example of cell arrangement based on recommended position information.

FIG. 13 is an explanatory view for explaining an example of cell arrangement based on the recommended position information. As illustrated in FIG. 13, when the recommended position information of the library information DB 42 has the plurality of conditions, there may be a case where a difference occurs between recommended positions of the cells 52A to 52C having a cell name "AA." In the illustrated example, for the power supply wiring 51, there is a difference in position between the cells 52A and 52C at the position of 0.08 nm in the X direction and the cell 52B at the position of 0.12 nm in the X direction.

Due to such a difference in position between the cells 52A to 52C, a crank may occur in a wiring path 54 connecting the terminals 53A to 53C, which may make the shape of the wiring path 54 complicated. When the wiring path 54 becomes complicated, for example, timing adjustment of FF (flip-flop) is affected, which may lead to circuit performance degradation. Therefore, by aggregating the conditions, it is possible to suppress the occurrence of a difference in position between the cells 52A to 52C, thereby preventing the performance deterioration in a circuit to be designed.

Here, details of the refining process of aggregating the recommended position information having the plurality of conditions into one of the conditions in which the relative positions to the power supply wiring 51 are different will be described.

Figure 14A:
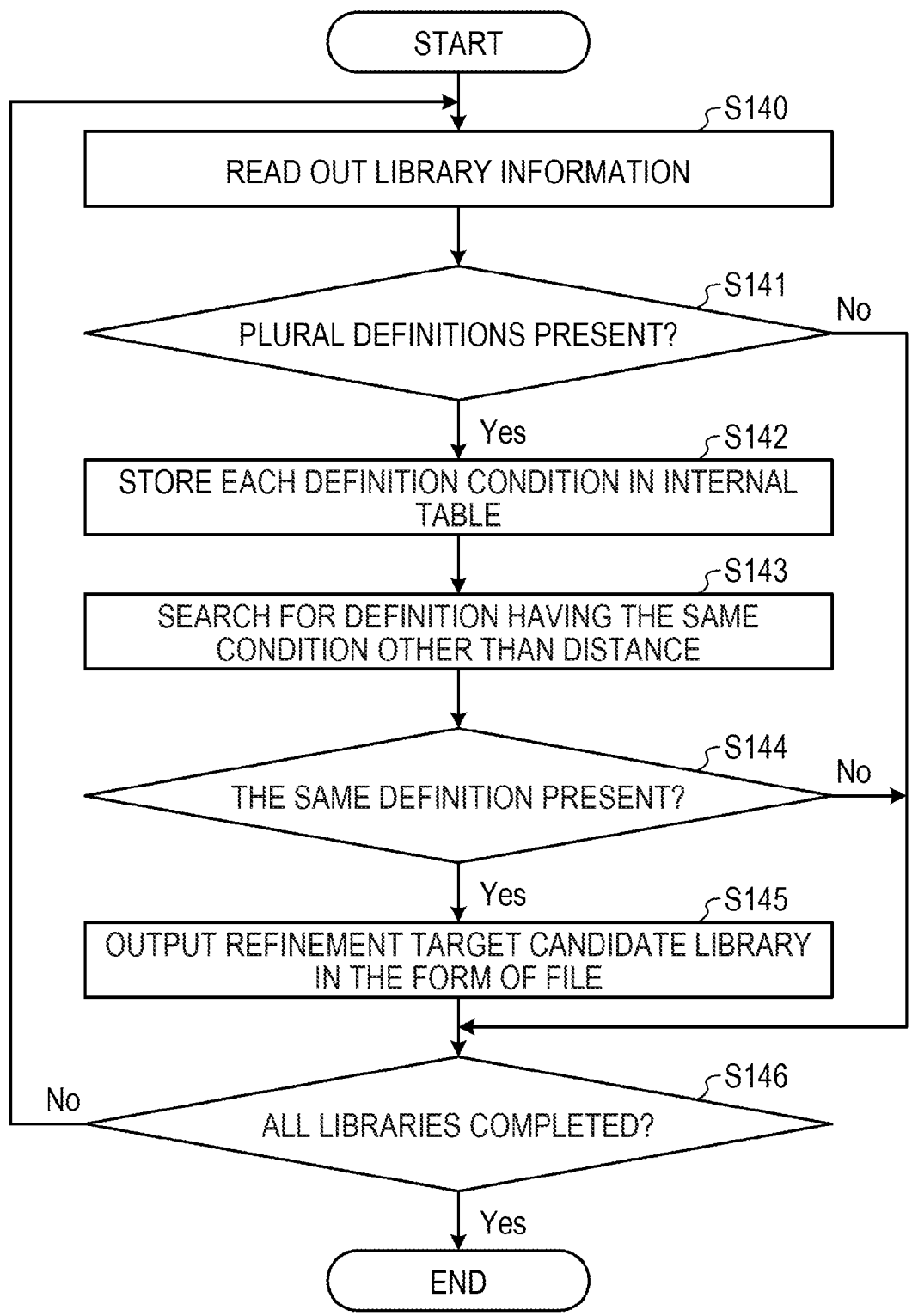
FIG. 14A is a flow chart illustrating an example of a refining process.
Figure 14B:
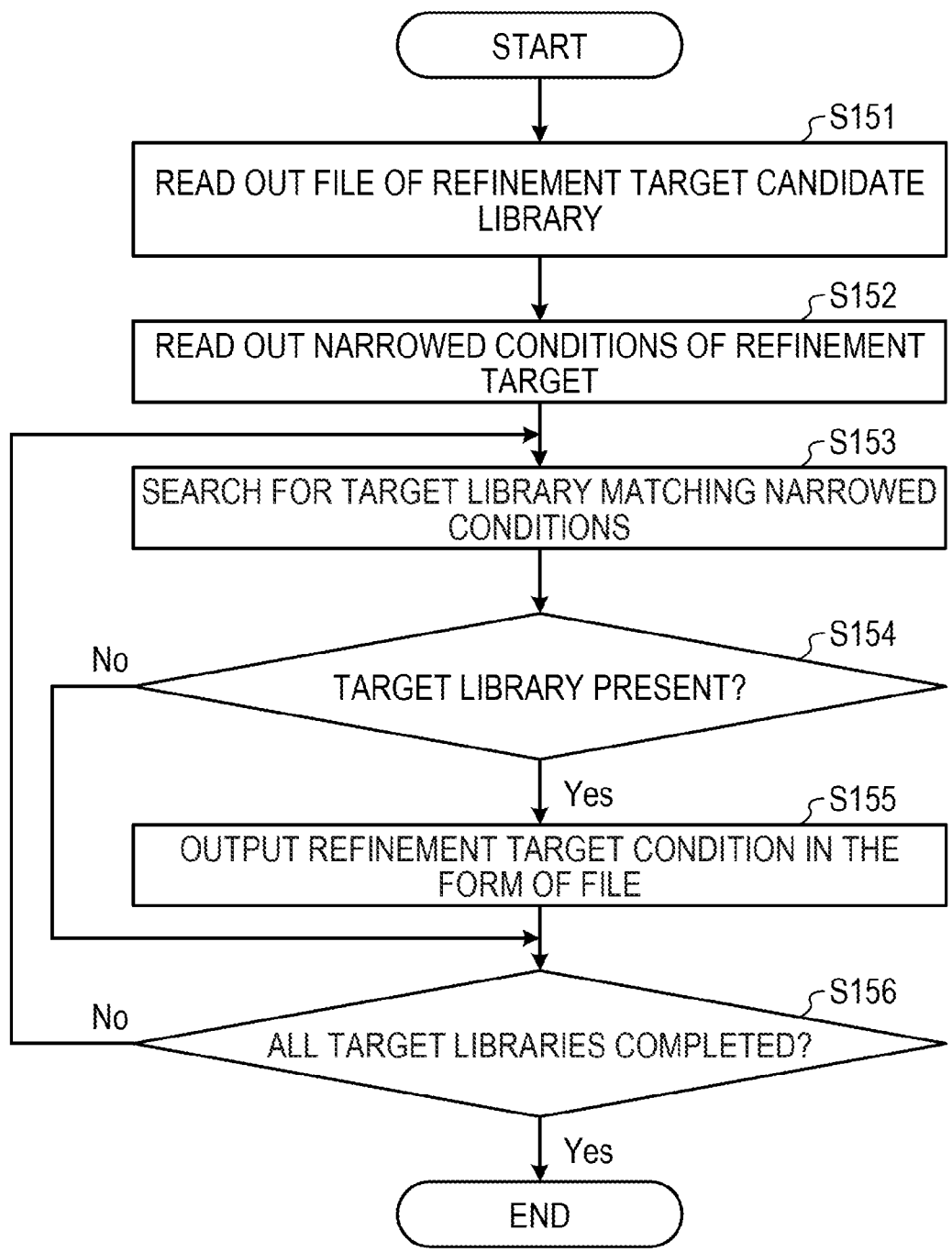
FIG. 14B is a flow chart illustrating an example of a refining process.
Figure 14C:
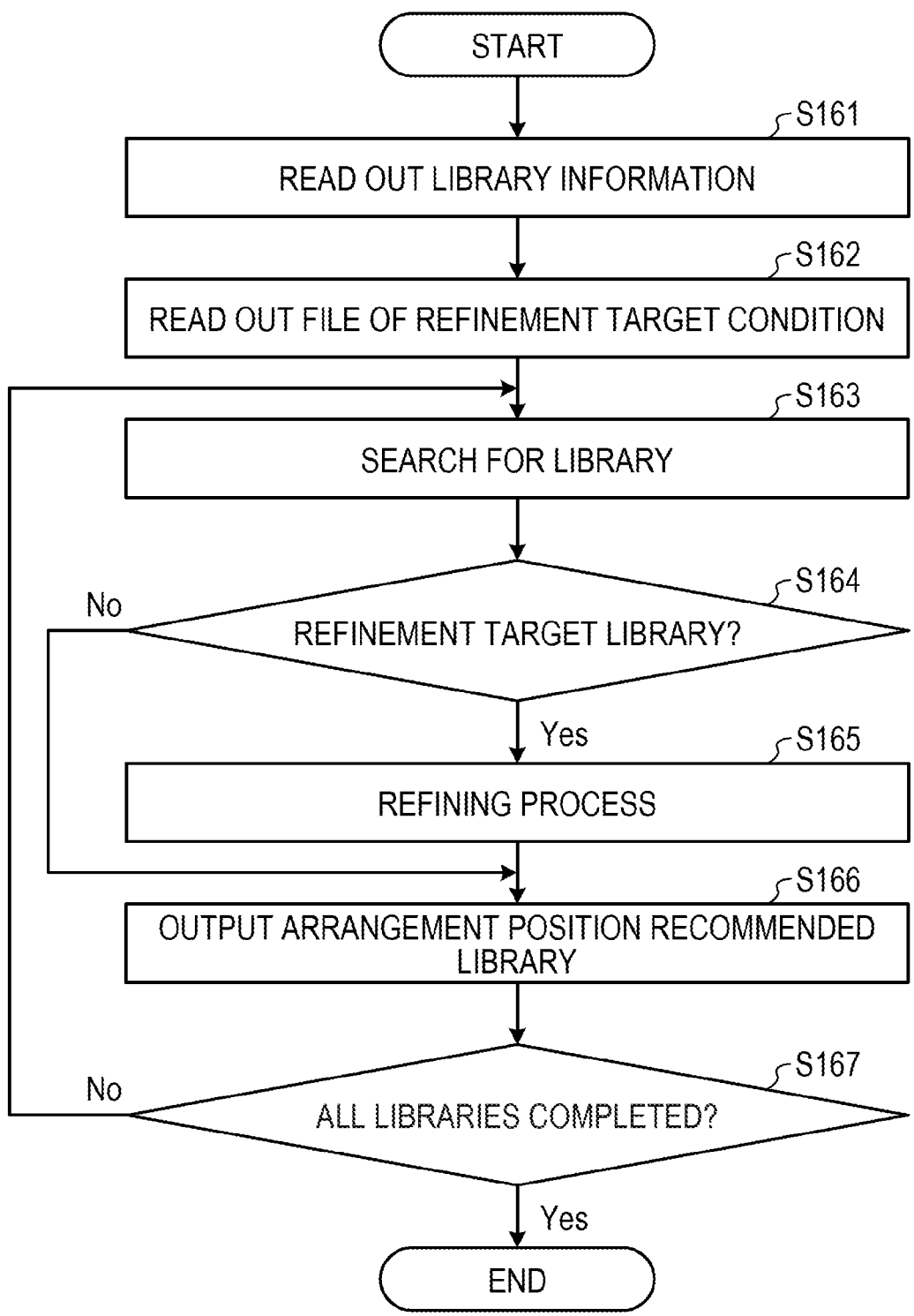
FIG. 14C is a flow chart illustrating an example of a refining process.

FIGS. 14A to 14C are flow charts showing an example of the refining process. As illustrated in FIG. 14A, first, the arrangement processing unit 12 sequentially reads library information such as recommended position information of each cell in the library information DB 42 (S140), and determines whether or not there are the definitions of a plurality of conditions in the recommended position information (S141). When there is no definition of multiple conditions (NO in S141), the arrangement processing unit 12 advances the process to S146.

When there are the definitions of a plurality of conditions (YES in S141), the arrangement processing unit 12 stores each condition in the internal table in the memory (S142). Next, the arrangement processing unit 12 refers to the internal table to search for definitions having the same condition other than the distance (S143), and determines the presence or absence of the same definition (S144). When there is no same definition (NO in S144), the arrangement processing unit 12 advances the process to S146.

When there is the same definition (YES in S144), the arrangement processing unit 12 outputs a library of recommended position information having the definitions of a plurality of conditions as a candidate library to be refined, in the form of a file (S145). Next, the arrangement processing unit 12 determines whether or not the process has been completed for all the libraries in the library information DB 42 (S146). When the process has not been completed (NO in S146), the arrangement processing unit 12 returns the process to S140. When the process has been completed (YES in S146), the arrangement processing unit 12 ends the process.

Next, as illustrated in FIG. 14B, the arrangement processing unit 12 reads the file of the candidate library to be refined (S151). Next, the arrangement processing unit 12 reads preset narrowed conditions as a refinement target (S152), and searches for a target library matching the narrowed conditions among candidate libraries to be refined (S153). As the narrowed conditions, for example, there is a distance condition closer to the power supply wiring 51.

Next, the arrangement processing unit 12 determines whether or not there is a target library matching the narrowed conditions (S154). When there is a target library (YES in S154), the arrangement processing unit 12 outputs it as a refinement target condition which is one of the integrated conditions, in the form of a file (S155). When there is no target library (NO in S154), the arrangement processing unit 12 skips the operation of S155.

Next, the arrangement processing unit 12 determines whether or not processing on all the candidate libraries to be refined has been completed (S156). When the processing has not been completed (NO in S156), the arrangement processing unit 12 returns the process to S153. When the processing has been completed (YES in S156), the arrangement processing unit 12 ends the process.

Next, as illustrated in FIG. 14C, the arrangement processing unit 12 reads the library information of each cell in the library information DB 42 (S161), and reads the file of a refinement target condition (S162). Next, the arrangement processing unit 12 refers to the library information of each cell to search for a library matching the refinement target condition (S163).

Next, the arrangement processing unit 12 determines the presence/absence of a refinement target library matching the refinement target condition (S164). When there is a refinement target library (YES in S164), the arrangement processing unit 12 performs a refining process to integrate the refinement target libraries into the refinement target conditions (S165). Specifically, the arrangement processing unit 12 integrates the recommended position information of the refinement target libraries into the refinement target conditions. When there is no refinement target library (NO in S164), the arrangement processing unit 12 skips the operation of S165.

Next, the arrangement processing unit 12 reads from the library information DB 42, outputs the library information subjected to the refining process (S 166), and updates the library information of the library information DB 42. Next, the arrangement processing unit 12 determines whether or not processing for all the library cells in the library information DB 42 has been completed (S167). When the processing has not been completed (NO in S167), the arrangement processing unit 12 returns the process to S163. When the processing has been completed (YES in S167), the arrangement processing unit 12 ends the process.

Figure 15:
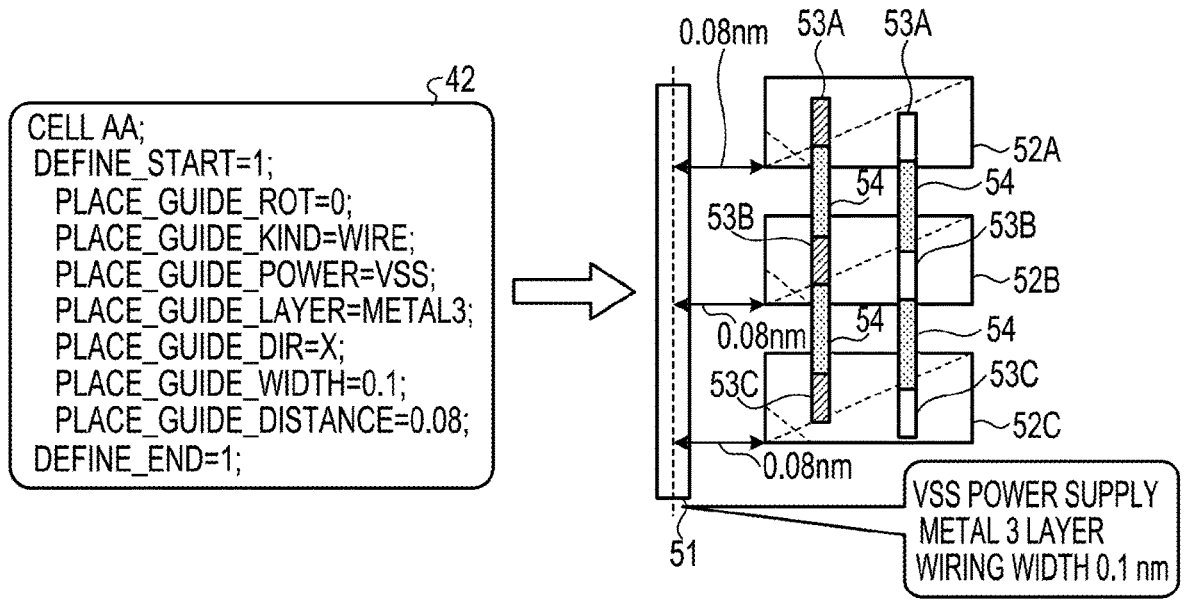
FIG. 15 is an explanatory view for explaining an example of cell arrangement based on recommended position information.

FIG. 15 is an explanatory view for explaining an example of cell arrangement based on the recommended position information. As illustrated in FIG. 15, the recommended position information in the library information DB 42 is integrated into one of the plurality of conditions exemplified in FIG. 13. In this way, by aggregating the conditions, it is possible to prevent a position difference from occurring between the cells 52A to 52C.

As described above, the design support apparatus 1 selects a cell to be arranged in circuit design according to a user instruction received from the input unit 20. In addition, the arrangement processing unit 12 of the design support apparatus 1 refers to the library information DB 42 including the definition information (recommended position information) that defines conditions of arrangement positions recommended for each cell when cells are arranged in circuit design. Then, based on the recommended position information, the arrangement processing unit 12 arranges the arrangement target cell at a position satisfying the condition of arrangement position that recommends the arrangement target cell. Thus, the design support apparatus 1 can arrange a cell at a recommended position at which no interference error occurs between the power supply wiring and the cell, so that a user can easily design a circuit.

In addition, the design support apparatus 1 includes the display unit 30 for displaying an arrangement screen of a cell to be arranged, and the input unit 20 for receiving an operation of the arrangement position of the cell on the arrangement screen. The arrangement processing unit 12 of the design support apparatus 1 arranges the cell whose arrangement position on the arrangement screen is manipulated, at a position satisfying the condition of the recommended arrangement position. Thus, the design support apparatus 1 can support the circuit design by a user such as an LSI designer by arranging the cell at a position recommended at the time of changing the layout of the cell on the arrangement screen.

In addition, the definition information defines the relative position with the power supply wiring related to the circuit design as the condition of the arrangement position. Then, the arrangement processing unit 12 of the design support apparatus 1 arranges the arrangement target cell at a position that satisfies the condition in which the relative position between the arrangement target cell and the power supply wiring of the circuit in which the cell is arranged is defined. Thus, the design support apparatus 1 can arrange a cell at a position in which no interference error occurs between the power supply wiring and the cell.

Further, the definition information has a plurality of conditions of arrangement positions recommended when cells are arranged in circuit design. Then, the arrangement processing unit 12 of the design support apparatus 1 arranges an arrangement target cell at a position that satisfies at least one of the plurality of conditions. In this manner, there may be a plurality of conditions of arrangement positions at which the cell arrangement is recommended, and the design supporting apparatus 1 may arrange a cell at a position that satisfies any one of the plurality of conditions.

Further, the arrangement processing unit 12 of the design support apparatus 1 integrates the definition information having the plurality of conditions into one of the conditions in which the relative positions with the power supply wiring are different, and arranges an arrangement target cell at a position satisfying the integrated conditions. In this way, by arranging the cell at the position satisfying one of the integrated conditions in which the relative positions with the power supply wiring are different, for example, the relative positions between a plurality of cells and the power supply wiring can be aligned, which can make the wiring paths between cells aligned.

Each constituent element of each of the illustrated units is not necessarily physically configured in the same manner as that illustrated. In other words, the specific form of distribution and integration of the units is not limited to that illustrated, but all or some of the units may be distributed or integrated functionally or physically in arbitrary units according to various loads, usage conditions.

In addition, various processing functions performed by the design support apparatus 1 may be entirely or partially executed on a CPU (or a microcomputer such as an MPU or a micro controller unit (MCU)). Of course, the various processing functions may be entirely or partially executed on a program analyzed and executed by a CPU (or a microcomputer such as an MPU or an MCU) or on hardware by wired logic. Further, the various processing functions performed by the design support apparatus 1 may be executed by a plurality of computers in cooperation by cloud computing.

Incidentally, the various processes described in the above embodiment can be realized by a computer executing a prepared program. Therefore, an example of a computer (hardware) that executes a program having the same function as in the above embodiment will be described below.

Figure 16:
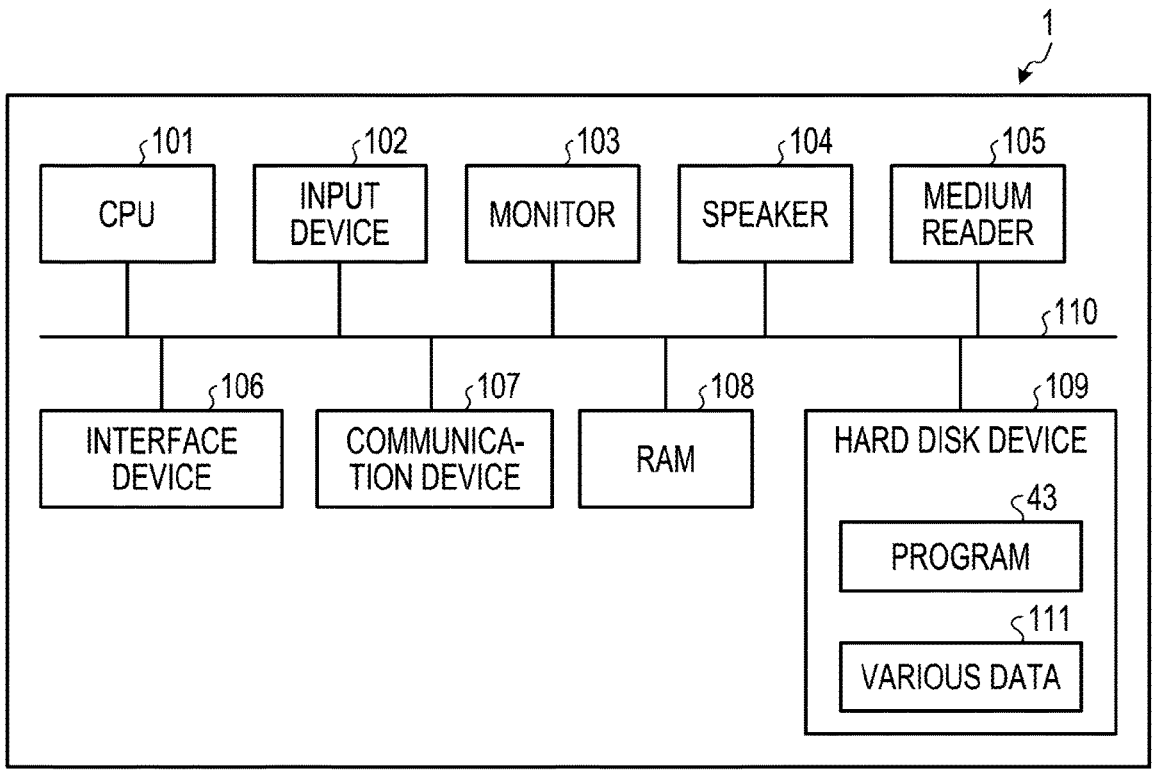
FIG. 16 is a block diagram illustrating an example of the hardware configuration of a design support apparatus according to an embodiment.

FIG. 16 is a block diagram illustrating an example of a hardware configuration of the design support apparatus 1 according to an embodiment.

As illustrated in FIG. 16, the design support apparatus 1 includes a CPU 101 that executes various calculation processes, an input device 102 that receives data input, a monitor 103 and a speaker 104. Further, the design support apparatus 1 includes a medium reader 105 that reads a program from a storage medium, an interface device 106 for connecting to various devices, and a communication device 107 for communicating with an external device by wire or wireless. Further, the design support apparatus 1 includes a RAM 108 for temporarily storing various kinds of information, and a hard disk device 109. The units 101 to 109 in the design support apparatus 1 are connected to a bus 110.

The hard disk device 109 stores a program 43 for executing various processes described in the above embodiment. Further, the hard disk device 109 stores various data 111 (the design information DB 41 and the library information DB 42) referred to by the program 43. The input device 102 receives input of operation information from an operator of the design support apparatus 1. The monitor 103 displays various screens operated by the operator. A printer is connected to the interface device 106. The communication device 107 is connected to a communication network such as a LAN (Local Area Network) and exchanges various kinds of information with an external device via the communication network.

The CPU 101 performs various processes by reading out the program 43 stored in the hard disk device 109 and deploying and executing the read program 43 on the RAM 108. The program 43 may not be stored in the hard disk device 109. For example, the design support apparatus 1 may read out and execute the program 43 stored in a storage medium readable by the design support apparatus 1. Examples of the storage medium readable by the design support apparatus 1 may include a portable recording medium such as a CD-ROM, a DVD disk, or a universal serial bus (USB) memory, a semiconductor memory such as a flash memory, and a hard disk drive. Further, this program 43 may be stored in a device connected to a public line, the Internet, or a LAN and the design support apparatus 1 may read out and execute the program 43 from this device.

All examples and conditional language recited herein are intended for pedagogical purposes to aid the reader in understanding the disclosure and the concepts contributed by the inventor to furthering the art, and are to be construed as being without limitation to such specifically recited examples and conditions, nor does the organization of such examples in the specification relate to a showing of the superiority and inferiority of the disclosure. Although the embodiment(s) of the present disclosure has (have) been described in detail, it should be understood that the various changes, substitutions, and alterations could be made hereto without departing from the spirit and scope of the disclosure.

What is claimed is:

1. A design support apparatus comprising:
a memory; and
a processor coupled to the memory and the processor configured to:
store, for each of a plurality of cells, definition information that defines a distance between a cell and a power supply wiring as a condition of an arrangement position recommended for each of the plurality of cells in the memory, the plurality of cells being different from each other, and the definition information that corresponds to each of the plurality of cells being stored in the memory;
obtain an arrangement target cell from the plurality of cells; and
arrange the arrangement target cell at a position that satisfies the condition defined in the definition information for the distance between the arrangement target cell and the power supply wiring of a circuit in which the arrangement target cell is arranged when the arrangement target cell is arranged, based on the definition information stored in the memory that corresponds to the arrangement target cell.

2. The design support apparatus according to claim 1, wherein the processor is further configured to:
display an arrangement screen of the arrangement target cell; and
operate a cell arrangement position on the arrangement screen, and
wherein the processor is configured to arrange the arrangement target cell whose arrangement position on the arrangement screen is operated, at a position that satisfies the condition.

3. The design support apparatus according to claim 1,
wherein the definition information includes a plurality of conditions of arrangement positions, and
wherein the processor is configured to arrange the arrangement target cell at a position that satisfies at least one of the plurality of conditions.

4. The design support apparatus according to claim 3, wherein the plurality of conditions have different distances between the arrangement target cell and the power supply wiring, respectively, and
the processor is configured to integrate the plurality of conditions included in the definition information into one of the plurality of conditions to generate an integrated condition with same relative position distance, and arrange the arrangement target cell at a position that satisfies the integrated condition.

5. A computer-readable non-transitory recording medium storing a program that causes a computer to execute a procedure, the procedure comprising:
storing, for each of a plurality of cells, definition information that defines a distance between a cell and a power supply wiring as a condition of an arrangement position recommended for each of the plurality of cells in a memory, the plurality of cells being different from each other, and the definition information that corresponds to each of the plurality of cells being stored in the memory;
obtaining an arrangement target cell from the plurality of cells; and
arranging the arrangement target cell at a position that satisfies the condition defined in the definition information for the distance between the arrangement target cell and the power supply wiring of a circuit in which the arrangement target cell is arranged when the arrangement target cell is arranged, based on the definition information stored in the memory that corresponds to the arrangement target cell.

6. The computer-readable non-transitory recording medium according to claim 5, wherein the procedure further comprising:
displaying an arrangement screen of the arrangement target cell; and
operating a cell arrangement position on the arrangement screen, and wherein the procedure arranges the arrangement target cell whose arrangement position on the arrangement screen is operated, at a position that satisfies the condition.

7. The computer-readable non-transitory recording medium according to claim 5, wherein the definition information includes a plurality of conditions of arrangement positions, and
wherein the procedure arranges the arrangement target cell at a position that satisfies at least one of the plurality of conditions.

8. The computer-readable non-transitory recording medium according to claim 7,
wherein the plurality of conditions have different distances between the arrangement target cell and the power supply wiring, respectively, and
the procedure integrates the plurality of conditions included in the definition information into one of the plurality of conditions to generate an integrated condition with same distance, and arranges the arrangement target cell at a position that satisfies the integrated condition.

9. A design support method comprising:
storing, for each of a plurality of cells, definition information that defines a distance between a cell and a power supply wiring as a condition of an arrangement position recommended for each of the plurality of cells in a memory, the plurality of cells being different from each other, and the definition information that corresponds to each of the plurality of cells being stored in the memory;
obtaining an arrangement target cell from the plurality of cells; and
arranging the arrangement target cell at a position that satisfies the condition defined in the definition information for the distance between the arrangement target cell and the power supply wiring of a circuit in which the arrangement target cell is arranged when the arrangement target cell is arranged, based on the definition information stored in the memory that corresponds to the arrangement target cell, by a processor.

10. The design support method according to claim 9, further comprising:
displaying an arrangement screen of the arrangement target cell; and
operating a cell arrangement position on the arrangement screen,
wherein the processor arranges the arrangement target cell whose arrangement position on the arrangement screen is operated, at a position that satisfies the condition.

11. The design support method according to claim 9,
wherein the definition information includes a plurality of conditions of arrangement positions, and
wherein the processor arranges the arrangement target cell at a position that satisfies at least one of the plurality of conditions.

12. The design support method according to claim 11, wherein the plurality of conditions have different distances between the arrangement target cell and the power supply wiring, respectively, and
the processor integrates the plurality of conditions included in the definition information into one of the plurality of conditions to generate an integrated condition with same distance, and arranges the arrangement target cell at a position that satisfies the integrated condition.

13. The design support apparatus according to claim 1, wherein the processor is configured to:
determine whether or not the power supply wiring and a prohibition position in the arrangement target cell overlap with each other when the arrangement target cell is arranged at a predetermined position; and
storing the predetermined position as the arrangement position in the memory when determined that the power supply wiring and the prohibition position in the arrangement target cell do not overlap with each other.

14. The design support apparatus according to claim 4, wherein the one of the plurality of conditions is the condition that has a distance closest to the power supply wiring among the different distances.

* * * * *